United States Patent
Takeuchi et al.

(10) Patent No.: US 8,803,398 B2
(45) Date of Patent: Aug. 12, 2014

(54) CORELESS ELECTRIC MACHINE APPARATUS, MOVING BODY, ROBOT AND MANUFACTURING METHOD OF THE CORELESS ELECTRIC MACHINE APPARATUS

(75) Inventors: Kesatoshi Takeuchi, Shiojiri (JP); Kazuyoshi Nakamura, Azumino (JP)

(73) Assignee: Seiko Epson Corporation (JP)

( * ) Notice: Subject to any disclaimer, the term of this patent is extended or adjusted under 35 U.S.C. 154(b) by 170 days.

(21) Appl. No.: 13/483,468

(22) Filed: May 30, 2012

(65) Prior Publication Data

US 2012/0306310 A1  Dec. 6, 2012

(30) Foreign Application Priority Data

Jun. 3, 2011 (JP) .................................. 2011-125106

(51) Int. Cl.
*H02K 3/04* (2006.01)
(52) U.S. Cl.
USPC .......................................... 310/208; 310/180
(58) Field of Classification Search
USPC .......................... 310/179–180, 184, 203, 208
See application file for complete search history.

(56) References Cited

U.S. PATENT DOCUMENTS

| | | | |
|---|---|---|---|
| 5,304,884 A * | 4/1994 | Kitajima et al. | 310/198 |
| 6,894,418 B2 * | 5/2005 | Jones et al. | 310/208 |
| 7,246,428 B2 | 7/2007 | Fukasaku et al. | |
| 7,573,173 B1 * | 8/2009 | Frownfelter | 310/208 |
| 7,683,517 B2 | 3/2010 | Fukasaku et al. | |
| 2004/0021391 A1 * | 2/2004 | Jones et al. | 310/208 |
| 2006/0238059 A1 | 10/2006 | Komatsu | |
| 2007/0145852 A1 * | 6/2007 | Schon et al. | 310/180 |
| 2009/0108695 A1 * | 4/2009 | Scott | 310/208 |
| 2010/0164319 A1 * | 7/2010 | Metsberg et al. | 310/208 |
| 2010/0225193 A1 * | 9/2010 | Clark | 310/208 |

FOREIGN PATENT DOCUMENTS

| | | |
|---|---|---|
| JP | 09-163643 | 6/1997 |
| JP | 2000-184646 | 6/2000 |
| JP | 2001-231204 | 8/2001 |
| JP | 2002-199666 | 7/2002 |
| JP | 2005-020987 | 1/2005 |
| JP | 2005-094927 | 4/2005 |
| JP | 2005-295689 | 10/2005 |
| JP | 2008-061312 | 3/2008 |
| JP | 4594549 | 9/2010 |
| WO | 2005-018071 | 2/2005 |

* cited by examiner

*Primary Examiner* — Thanh Lam
(74) *Attorney, Agent, or Firm* — Harness, Dickey & Pierce, P.L.C.

(57) ABSTRACT

A coreless electric machine includes: a permanent magnet on a first member; N-phase (N≥2) air-core electromagnetic coils on a second member; and a coil back yoke on the second member, each electromagnetic coil including a conductor bundle in which a conductor is wound M times (M≥2), coil sub-aggregates are provided, each including the N electromagnetic coils of the respective N phases and in each of which a conductor bundle forming an effective coil area of a first-phase electromagnetic coil contacts a second conductor bundle forming an effective coil area of another phase electromagnetic coil, and the second conductor bundle is in an air-core portion of the first phase electromagnetic coil, and the coil sub-aggregates are arranged along the cylindrical area, in which the coil sub-aggregates do not overlap in a radiation direction of the cylindrical area, and adjacent coil sub-aggregates contact each other.

9 Claims, 35 Drawing Sheets

| STRUCTURE | RELATIVE RATIO | | CHARACTERISTICS | |
|---|---|---|---|---|
| | VOLUME [%] | WEIGHT [%] | STARTING TORQUE [Nm] | TORQUE RATIO [%] |
| WITH CORE | 100 | 100 | 2.2 | 100 |
| RELATED ART | 100 | 100 | 2.7 | 123 |
| (I) | 100 | 105 | 4.3 | 195 |
| (II) | 105 | 105 | 4.5 | 205 |

FIG.10

COMPARATIVE EXAMPLE

| COMPONENT | SYMBOL | UNIT | COIL SINGLE BODY | | WITH COIL BACK YOKE | |
|---|---|---|---|---|---|---|
| | | | A-PHASE | B-PHASE | A-PHASE | B-PHASE |
| RESISTANCE VALUE | R | [Ω] | 37.97 | 37.33 | 37.97 | 37.33 |
| INDUCTANCE | L | [mH] | 6.52 | 8.26 | 6.52 | 12.5 |

FIG.11A

EMBODIMENT

| COMPONENT | SYMBOL | UNIT | COIL SINGLE BODY | | WITH COIL BACK YOKE | |
|---|---|---|---|---|---|---|
| | | | A-PHASE | B-PHASE | A-PHASE | B-PHASE |
| RESISTANCE VALUE | R | [Ω] | 37.97 | 37.97 | 37.97 | 37.97 |
| INDUCTANCE | L | [mH] | 6.52 | 6.52 | 10.5 | 10.5 |

FIG.11B

CORELESS ELECTRIC MACHINE APPARATUS, MOVING BODY, ROBOT AND MANUFACTURING METHOD OF THE CORELESS ELECTRIC MACHINE APPARATUS

BACKGROUND

1. Technical Field

The present invention relates to a coreless electric machine apparatus, a moving body, a robot and a manufacturing method of the coreless electric machine apparatus.

2. Related Art

A slotless motor is known in which a space factor of a coil (electromagnetic coil) is improved by sandwiching plural air core coils between insulative film-like sheets (see, for example, JP-A-2001-231204).

However, in the related art method, a space remains in a portion corresponding to the core of the electromagnetic coil, and further improvement of the space factor is not sufficiently considered.

SUMMARY

An advantage of some aspects of the invention is to improve the space factor of an electromagnetic coil and to improve the efficiency of a coreless electric motor (coreless electric machine apparatus).

Application Example 1

This application example of the invention is directed to a coreless electric machine apparatus including a first and a second cylindrical member movable relative to each other, and includes a permanent magnet arranged on the first member, N-phase (N is an integer of 2 or more) air-core electromagnetic coils arranged on the second member, and a coil back yoke arranged on the second member. The electromagnetic coils include effective coil areas for generating a force to move the first member relatively to the second member, and coil end areas. The effective coil areas of the N-phase electromagnetic coils have the same shape, and are arranged in a cylindrical area between the permanent magnet and the coil back yoke. The coil end area of at least (N−1)-phase electromagnetic coil among the N-phase electromagnetic coils is bent to an inner peripheral side or an outer peripheral side of the cylindrical area to prevent interference with the coil end area of the electromagnetic coil of another phase. Each of the electromagnetic coils includes a conductor bundle in which a conductor is wound M (M is an integer of 2 or more) times. Coil sub-aggregates are provided, each of which includes the N electromagnetic coils of the respective N phases and in each of which a conductor bundle forming an effective coil area of a first-phase electromagnetic coil contacts a conductor bundle forming an effective coil area of another phase electromagnetic coil, and the conductor bundle forming the effective coil area of the another phase electromagnetic coil is contained in an air-core portion of the electromagnetic coil of the first phase. The coil sub-aggregates are arranged along the cylindrical area, the coil sub-aggregates do not overlap each other in a radiation direction of the cylindrical area, and the adjacent coil sub-aggregates contact each other.

According to this application example of the invention, the coil aggregates are formed in each of which the air-core portion of the first-phase electromagnetic coil in the effective coil area is embedded with the conductor bundle forming the effective coil area of the electromagnetic coil of the another phase in such a way that the adjacent conductor bundles contact each other without a gap. The plural coil aggregates are arranged so that the coil aggregates do not overlap each other and the adjacent coil aggregates contact each other. Thus, the space factor of the electromagnetic coil can be raised, and the efficiency of the coreless electric machine apparatus can be improved.

Application Example 2

This application example of the invention is directed to the coreless electric machine apparatus of Application Example 1, wherein the value of N is 2, each of the electromagnetic coils includes an air core having a same size as a width of the conductor bundle, and a conductor bundle forming an effective coil area of a second electromagnetic coil is contained in an air core of a first electromagnetic coil.

According to this coreless electric machine apparatus, when the coreless motor has two phases, since the width of the conductor bundle is made equal to the size of the air core, the space factor of the electromagnetic coil can be improved, and the efficiency of the coreless electric machine apparatus can be improved.

Application Example 3

This application example of the invention is directed to the coreless electric machine apparatus of Application Example 1, wherein the value of N is 3, each of the electromagnetic coils includes an air core having a size twice a width of the conductor bundle, and conductor bundles forming effective coil areas of a second and a third electromagnetic coil are contained in an air core of a first electromagnetic coil.

According to this coreless electric machine apparatus, when the coreless motor has three phases, since the electromagnetic coil includes the air core having the size twice the width of the conductor bundle, the space factor of the electromagnetic coil can be improved, and the efficiency of the coreless electric machine apparatus can be improved. Incidentally, in general, when the coreless motor has N phases, the electromagnetic coil includes an air core having a size (N−1) times larger than the width of the conductor bundle.

Application Example 4

This application example of the invention is directed to a moving body including the coreless electric machine apparatus of any of Application Examples 1 to 3.

Application Example 5

This application example of the invention is directed to a robot including the coreless electric machine apparatus of any of Application Examples 1 to 3.

Application Example 6

This application example of the invention is directed to a manufacturing method of a coreless electric machine apparatus including N (N is an integer of 2 or more)-phase electromagnetic coils including (a) preparing cylindrical pieces of the N electromagnetic coils having effective coil areas equal to each other in shape and having electric resistance values equal to each other by winding a conductor M (M is an integer of 2 or more) times, (b) bending a coil end area of at least (N−1) electromagnetic coil among the N electromagnetic coils to an inner peripheral side or an outer peripheral side of the cylindrical piece to prevent interference with a coil end area of another electromagnetic coil, (c) forming coil sub-aggregates, in each of which a conductor bundle including M conductors and forming an effective coil area of a first electromagnetic coil among the N electromagnetic coils contacts an adjacent conductor bundle including M conductors and forming an effective coil area of another (N−1) electromagnetic coil, (d) forming the electromagnetic coils arranged into a cylindrical shape by arranging P (P is an integer of 2 or more) coil sub-aggregates, in which the coil sub-aggregates do not overlap each other in a radiation direction of the cylindrical piece and the adjacent coil sub-aggregates contact each other, (e) arranging a coil back yoke on an outer peripheral side of a cylindrical area of the electromagnetic coils arranged in the cylindrical shape, and (f) arranging a rotation shaft including a permanent magnet on an inner peripheral side of the cylindrical area of the electromagnetic coils arranged in the cylindrical shape.

According to the manufacturing method, after the coil sub-aggregates are formed, the coil sub-aggregates are arranged in the cylindrical shape and the electromagnetic coils are formed. Accordingly, the coreless electric machine apparatus can be easily manufactured.

Application Example 7

This application example of the invention is directed to a manufacturing method of a coreless electric machine apparatus including N (N is an integer of 2 or more)-phase electromagnetic coils including (a) preparing cylindrical pieces of the N electromagnetic coils having effective coil areas equal to each other in shape and having electric resistance values equal to each other by winding a conductor M (M is an integer of 2 or more) times, (b) bending a coil end area of at least (N−1) electromagnetic coil among the N electromagnetic coils to an inner peripheral side or an outer peripheral side of the cylindrical piece to prevent interference with a coil end area of another electromagnetic coil, (c) forming coil sub-aggregates, in each of which a conductor bundle including M conductors and forming an effective coil area of a first electromagnetic coil among the N electromagnetic coils contacts an adjacent conductor bundle including M conductors and forming an effective coil area of another (N−1) electromagnetic coil, (d) preparing a cylindrical coil back yoke, (e) forming the electromagnetic coils arranged into a cylindrical shape by arranging P (P is an integer of 2 or more) coil sub-aggregates, in which the coil sub-aggregates do not overlap each other in a radiation direction of the cylindrical piece and the adjacent coil sub-aggregates contact each other, and (f) arranging a rotation shaft including a permanent magnet on an inner peripheral side of the cylindrical area of the electromagnetic coils arranged in the cylindrical shape.

According to this manufacturing method, since the coil sub-aggregates are arranged from the inside of the coil back yoke, the coil back yoke having no divided structure can be used.

Incidentally, the invention can be realized in various forms, and can be realized in forms of, for example, a coreless electric machine apparatus such as a motor or a power generator, and further, in forms of a moving body using the same or a robot.

BRIEF DESCRIPTION OF THE DRAWINGS

The invention will be described with reference to the accompanying drawings, wherein like numbers reference like elements.

FIG. 10 is an explanatory view in which characteristics of the coreless motors of the first and the second embodiment are compared with characteristics of a motor with core and a related art coreless motor.

FIG. 11A is an explanatory view showing electric resistances and inductances of electromagnetic coils of the related art coreless motor.

FIG. 11B is an explanatory view showing electric resistances and inductances in the coreless motor of the first embodiment.

DESCRIPTION OF EXEMPLARY EMBODIMENTS

First Embodiment

Figure 1:
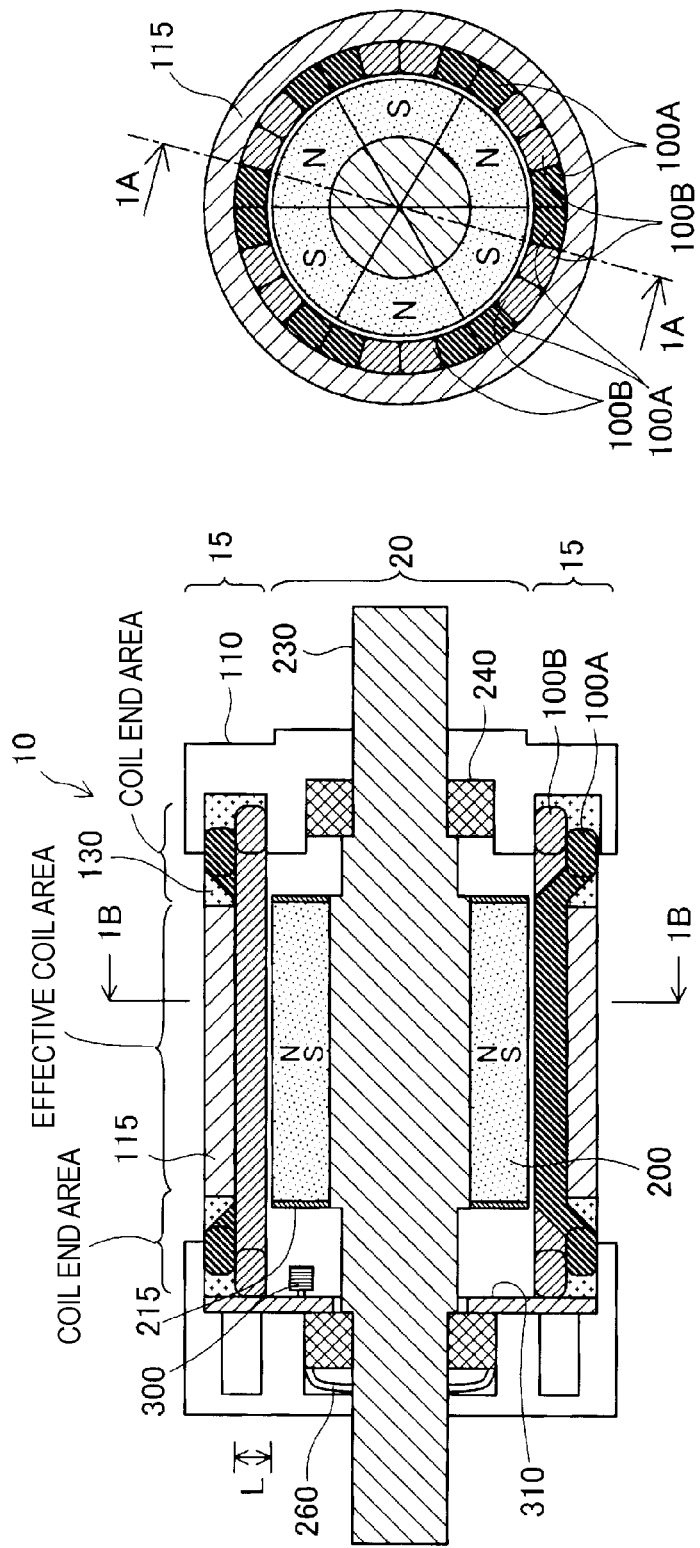
FIGS. 1A and 1B are explanatory views showing a first embodiment.

FIGS. 1A and 1B are explanatory views showing a first embodiment. FIG. 1A is a view schematically showing a section of a coreless motor 10 cut along a cut line (1A-1A of FIG. 1B) parallel to a rotation shaft 230 and viewed from a direction perpendicular to the section. FIG. 1B is a view schematically showing a section of the coreless motor 10 cut along a cut line (1B-1B of FIG. 1A) perpendicular to the rotation shaft 230 and viewed from a direction perpendicular to the section. The coreless motor 10 is an inner rotor motor of a radial gap structure in which a substantially cylindrical stator 15 is arranged on an outside and a substantially cylindrical rotor 20 is arranged on an inside. The stator 15 includes a coil back yoke 115 arranged along an inner periphery of a casing 110, and plural coreless electromagnetic coils 100A and 100B arranged inside the coil back yoke 115. The coil back yoke 115 is formed of a magnetic material and has a substantially cylindrical shape. In this embodiment, if the electromagnetic coils 100A and 100B are not distinguished from each other, each of them is simply called an electromagnetic coil 100. The electromagnetic coil 100A and the electromagnetic coil 100B are molded with a resin 130 and are arranged on the same cylindrical surface. Incidentally, although the coil back yoke 115, together with the electromagnetic coils 100A and 100B, is molded with the resin 130, the coil back yoke 115 is arranged on the outer peripheral side of the electromagnetic coils 100A and 100B. The lengths of the electromagnetic coils 100A and 100B in the direction along the rotation shaft 230 are longer than the length of the coil back yoke 115 in the direction along the rotation shaft 230. That is, in FIG. 1A, ends of the electromagnetic coils 100A and 100B in the right-and-left direction do not overlap the coil back yoke 115. In this embodiment, an area where the electromagnetic coil overlaps the coil back yoke 115 is called an effective coil area, and an area where the electromagnetic coil does not overlap the coil back yoke 115 is called a coil end area. In this embodiment, although the effective coil area and the coil end area of the electromagnetic coil 100B, and the effective coil area of the electromagnetic coil 100A are on the same cylindrical surface, the coil end area of the electromagnetic coil 100A is bent outward from the cylindrical surface.

The stator 15 further includes a magnetic sensor 300 as a position sensor to detect the phase of the rotor 20. As the magnetic sensor 300, for example, a signal amplifier circuit including a hall sensor or a hall sensor IC including a temperature compensation circuit can be used. The magnetic sensor 300 generates a substantially sine-wave sensor signal. This sensor signal is used to generate a drive signal to drive the electromagnetic coil 100. Accordingly, it is preferable to provide two such magnetic sensors 300 corresponding to the electromagnetic coils 100A and 100B. The magnetic sensor 300 is fixed on a circuit board 310, and the circuit board 310 is fixed to the casing 110. Incidentally, in FIGS. 1A and 1B, although only the one magnetic sensor 300 is shown, the coreless motor 10 may include two magnetic sensors corresponding to the electromagnetic coils 100A and 100B.

The rotor 20 includes the rotation shaft 230 at the center, and includes plural permanent magnets 200 on the outer periphery. Each of the permanent magnets 200 is magnetized along a radius direction (radiation direction) from the center of the rotation shaft 230 to the outside. Incidentally, in FIG. 1B, reference characters N and S given to the permanent magnets 200 represent polarities of the permanent magnets 200 on the side of the electromagnetic coils 100A and 100B. The permanent magnet 200 and the electromagnetic coil 100 are arranged to face the cylindrical surface which the rotor 20 and the stator 15 face. Here, the length of the permanent magnet 200 in the direction along the rotation shaft 230 is the same as the length of the coil back yoke 115 in the direction along the rotation shaft 230. That is, an area where an area sandwiched between the permanent magnet 200 and the coil back yoke 115 overlaps the electromagnetic coil 100A or 100B is the effective coil area. Here, an interval between the surface of the permanent magnet 200 and the coil back yoke 115 is called a distance L. Magnet back yokes 215 are arranged at both ends of the permanent magnet 200 in the direction of the rotation shaft 230. The magnet back yokes 215 prevent the magnetic flux of the permanent magnet 200 from leaking in the direction along the rotation shaft 230. The rotation shaft 230 is supported by a bearing 240 of the casing 110. In this embodiment, a wave spring washer 260 is provided inside the casing 110. The wave spring washer 260 performs positioning of the permanent magnet 200. However, the wave spring washer 260 can be replaced by another component.

Figure 2:
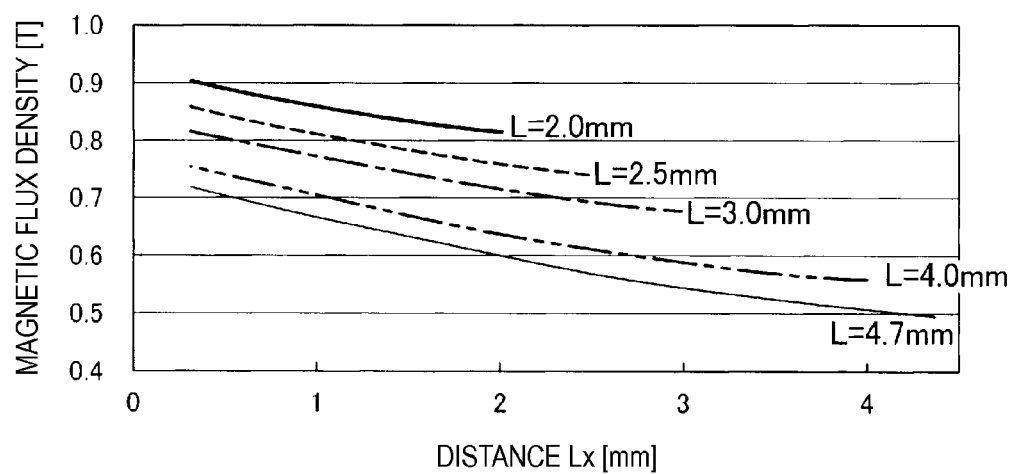
FIG. 2 is an explanatory view showing a relation between an interval between a surface of a permanent magnet and a coil back yoke and a magnetic flux density.

FIG. 2 is an explanatory view showing a relation between the interval L between the surface of the permanent magnet and the coil back yoke and a magnetic flux density. If the interval L between the surface of the permanent magnet and the coil back yoke is not changed, as a distance Lx from the surface of the permanent magnet 200 becomes large, the magnetic flux density decreases. Besides, it is understood that if a measurement position (distance Lx from the permanent magnet) where the magnetic flux density is measured is constant, as the distance L between the permanent magnet 200 and the coil back yoke 115 becomes small, the magnetic flux density increases. Accordingly, when the electromagnetic coil 100 is formed so that the thickness of the electromagnetic coil 100 becomes thin, and the distance L between the permanent magnet 200 and the coil back yoke 115 is formed to become short, the magnetic flux density received by the electromagnetic coil 100 increases and the efficiency of the coreless motor 10 can be improved.

Figure 3A:
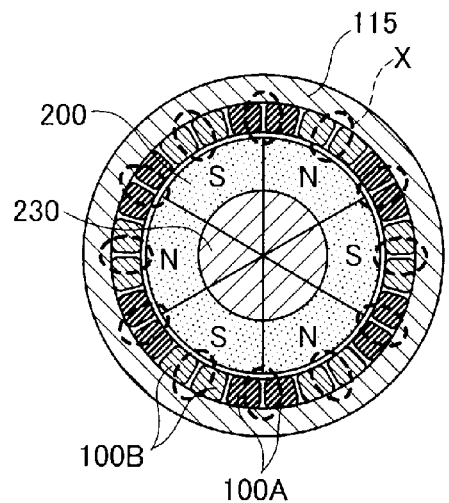
FIG. 3A is a view in which in FIG. 1B, a mark X of a broken line is given to a boundary part between adjacent electromagnetic coils of the same phase.

FIG. 3A is a view in which a mark X of a broken line is given to a boundary part of adjacent electromagnetic coils of the same phase. Incidentally, although it is preferable that the adjacent electromagnetic coils 100 contact each other, a slight gap occurs between the two electromagnetic coils 100A or the two electromagnetic coils 100B because of a problem in the coil winding technique. FIG. 3A is different from FIGS. 1A and 1B in that the gap between the adjacent electromagnetic coils 100 is emphasized and shown. As stated above, the slight gap occurs between the two electromagnetic coils 100A or the two electromagnetic coils 100B because of the problem in the coil winding technique. At a place where the gap is coincident with the polar center ($\pi/2$ or $3\pi/2$ in FIG. 3B) of the permanent magnet 200 in the electrical angle, a maximum force F is generated by a maximum current flowing through the electromagnetic coil 100A or the electromagnetic coil 100B. Thus, improvement of a space factor of the electromagnetic coil is required for this gap. Here, the space factor is (cross section of a conductor of an electromagnetic coil)/(cross section of a cylindrical area where the electromagnetic coil is arranged). If the gap occurs between the two electromagnetic coils 100A or the two electromagnetic coils 100B, since the conductor of the electromagnetic coil does not exist in the gap, the space factor is reduced from 100%. However, as described later, since the effective coil areas of the two electromagnetic coils 100B are contained between the two effective coil areas of the electromagnetic coil 100A, a considerably high space factor can be kept in the effective coil area.

Figure 3B:
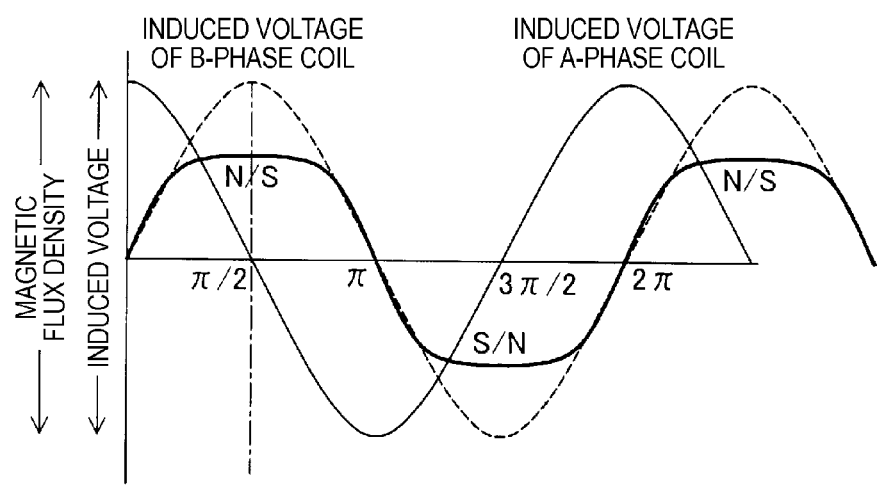
FIG. 3B is a graph showing an electrical angle of a coreless motor, induced voltages of electromagnetic coils, and a magnetic flux density detected by a magnetic sensor (FIG. 1A).

FIG. 3B is a graph showing the electrical angle of the coreless motor, the induced voltages of the electromagnetic coils, and the magnetic flux density detected by the magnetic sensor 300 (FIGS. 1A and 1B). In FIG. 3B, the electrical angle when the boundary part between the two permanent magnets 200 is coincident with the boundary of the two electromagnetic coils 100A (state of FIG. 3A) is $\pi/2$. The magnetic flux density detected by the magnetic sensor 300 becomes maximum when the electrical angle is $\pi/2$ ($3\pi/2$), and becomes minimum when the electrical angle is 0 ($\pi$, $2\pi$). Besides, the induced voltage of the electromagnetic coil 100B becomes maximum when the electrical angle is $\pi/2$ ($3\pi/2$), and becomes zero when the electrical angle is 0 ($\pi$, $2\pi$). On the other hand, the induced voltage of the electromagnetic coil 100A becomes zero when the electrical angle is $\pi/2$ ($3\pi/2$), and becomes maximum when the electrical angle is 0 ($\pi$, $2\pi$).

Figure 4A:
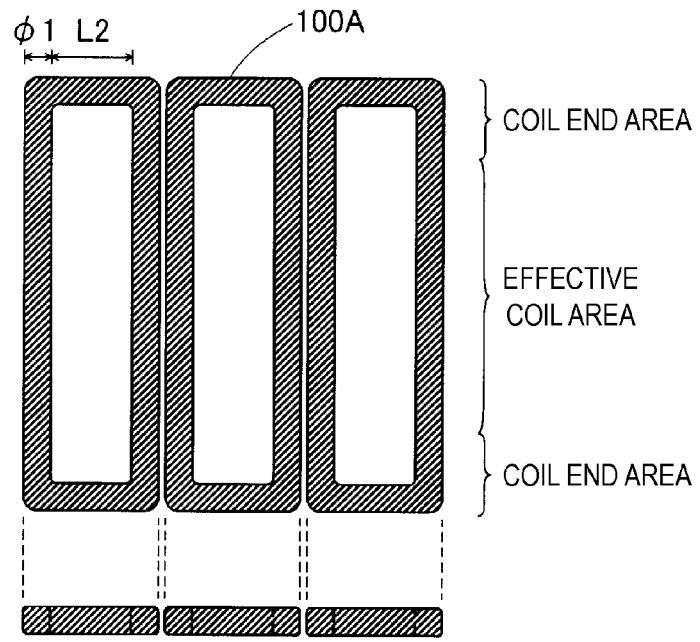
FIG. 4A is an explanatory view showing a state where an electromagnetic coil is formed on a plane.
Figure 4B:
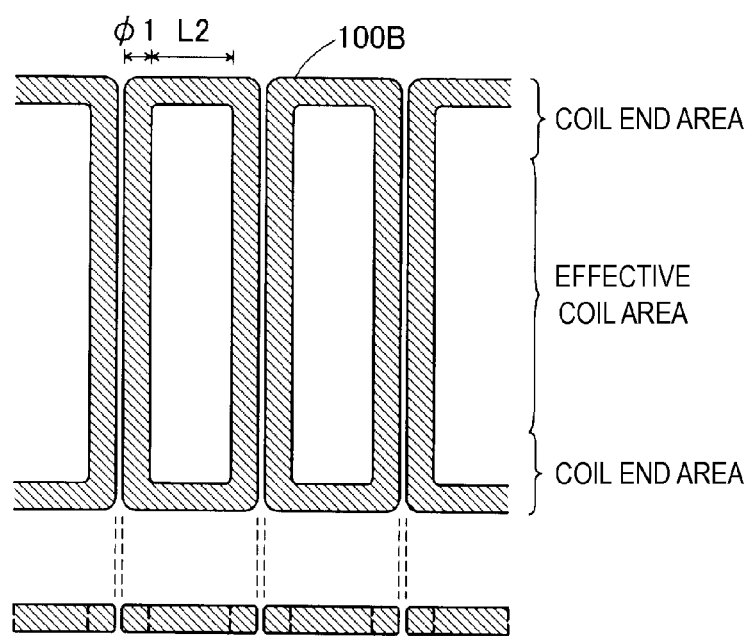
FIG. 4B is an explanatory view showing a state where an electromagnetic coil is formed on the plane.

FIG. 4A is an explanatory view showing a state where the electromagnetic coil 100A is formed on a plane. FIG. 4B is an explanatory view showing a state where the electromagnetic coil 100B is formed on the plane. The electromagnetic coil 100A and the electromagnetic coil 100B are formed of conductors of the same material and the same diameter. As is understood from the comparison between FIG. 4A and FIG. 4B, in the state where the electromagnetic coils 100A and 100B are formed on the plane, the electromagnetic coils 100A and 100B have the same shape. Besides, the number of turns of the electromagnetic coil 100A and the number of turns of the electromagnetic coil 100B are the same number M (M is an integer of 2 or more). Accordingly, although it is preferable that the electric resistance of the electromagnetic coil 100A and the electric resistance of the electromagnetic coil 100B have the same value, and the inductance of the electromagnetic coil 100A and the inductance of the electromagnetic coil 100B have the same value, no limitation is made to this. Besides, when the thickness of a bundle of conductors of each of the electromagnetic coils 100A and 100B is $\phi 1$, and the interval between coil bundles in the effective coil area is L2, the relation of $L2 \approx 2 \times \phi 1$ is established. Here, a bundle obtained by collecting M conductors forming the electromagnetic coils 100A and 100B is called the coil bundle (called a conductor bundle in the appended claims).

Figure 4C:
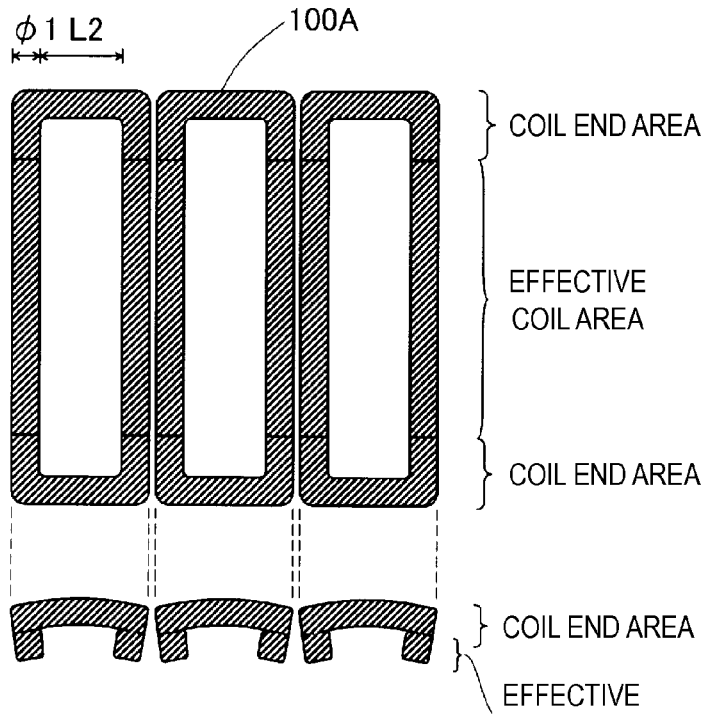
FIG. 4C is an explanatory view showing a state of the electromagnetic coil before being overlapped.
Figure 4D:
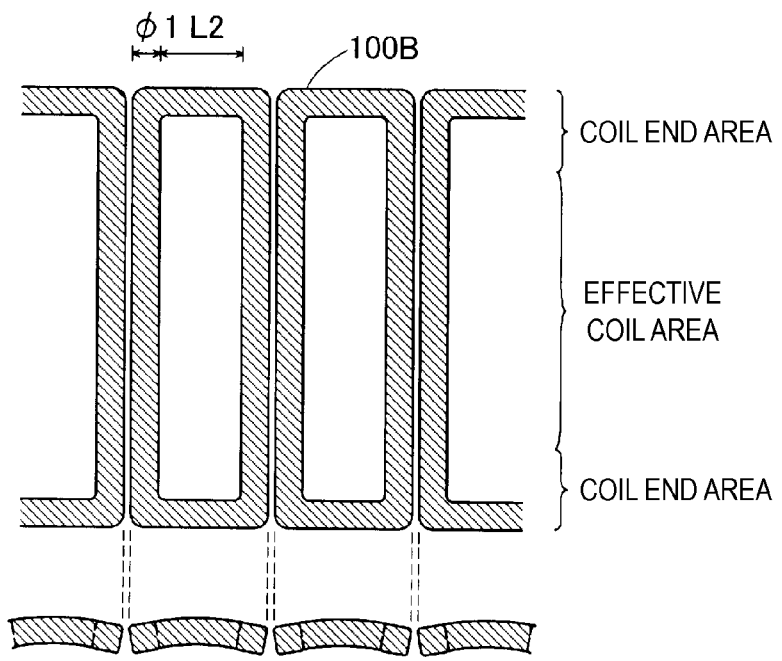
FIG. 4D is an explanatory view showing a state of the electromagnetic coil before being overlapped.

FIG. 4C is an explanatory view showing a state of the electromagnetic coil 100A before being overlapped. FIG. 4D is an explanatory view showing a state of the electromagnetic coil 100B before being overlapped. As shown in FIG. 4C, the whole of the electromagnetic coil 100A is bent along the cylindrical surface from the plane shape, and the coil end area of the electromagnetic coil 100A is bent in the outside direction from the cylindrical surface. On the other hand, as shown in FIG. 4D, although the whole of the electromagnetic coil 100B is bent along the cylindrical surface from the plane shape, the coil end area of the electromagnetic coil 100B is not bent in the outside direction from the cylindrical surface. Incidentally, since the electric resistance is not changed even if the shape is changed, the electric resistance of the electromagnetic coil 100A and the electric resistance of the electromagnetic coil 100B have the same value. On the other hand, although the shapes of the electromagnetic coil 100a and the electromagnetic coil 100B in the effective coil areas are the same, the shapes in the coil end areas are different from each other. That is, with respect to the inductance, although the inductances caused by the effective coil areas are the same, the inductances caused by the coil end areas are different. That is, the inductance of the electromagnetic coil 100A and the inductance of the electromagnetic coil 100B are slightly different from each other. In general, when the coil end area is bent, an area s of the electromagnetic coil 100A in the magnetic flux direction is reduced, and therefore, the inductance is reduced. For example, the inductance L of the coil is expressed by the following expression.

$$L = \frac{k \times \mu \times n^2 \times s}{l}$$

Here, k represents Nagaoka coefficient, μ represents magnetic permeability, n represents the number of turns of the electromagnetic coil, s represents the cross section of the electromagnetic coil, and l represents the length of the electromagnetic coil in the axial direction.

Figure 4E:
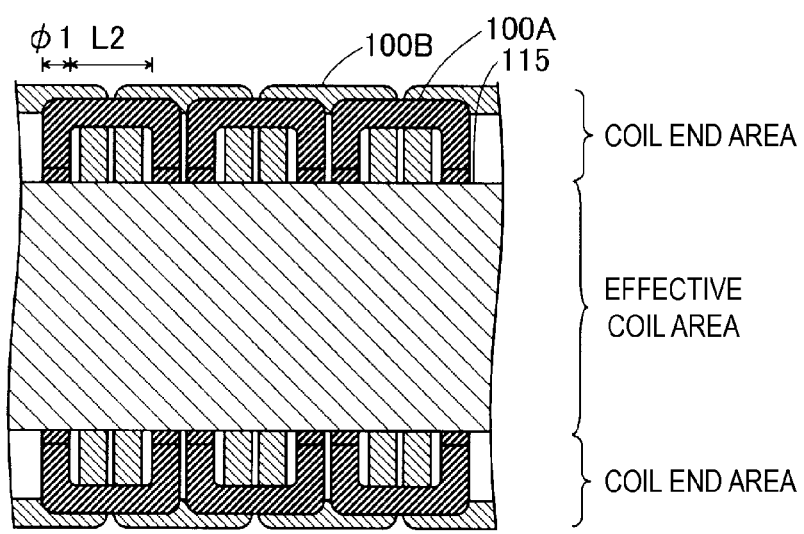
FIG. 4E is an explanatory view showing a state where the electromagnetic coils are overlapped each other.

FIG. 4E is an explanatory view showing a state where the electromagnetic coils 100A and 100B are overlapped. Incidentally, FIG. 4E shows the coil back yoke 115. The conductor bundles of the two electromagnetic coils 100B in the effective coil area are contained between the two conductor bundles of the electromagnetic coil 100A in the effective coil area. Besides, the conductor bundles of the two electromagnetic coils 100A in the effective coil area are contained between the two conductor bundles of the electromagnetic coil 100B in the effective coil area, and the electromagnetic coils 100A and 100B do not overlap each other. Besides, the coil end area of the electromagnetic coil 100A is bent outward from the cylindrical surface, and does not overlap the coil end area of the electromagnetic coil 100B. As stated above, the coil end area of the electromagnetic coil 100A is bent outward, so that the electromagnetic coils 100A and 100B can be arranged on the same cylindrical surface without overlapping. In this embodiment, the thickness φ1 of the conductor bundle of each of the electromagnetic coils 100A and 100B and the interval L2 between the coil bundles in the effective coil area have the relation of L2≈2×φ1. That is, since the cylindrical surface on which the electromagnetic coils 100A and 100B are arranged is almost occupied by the conductor bundles of the electromagnetic coils 100A and 100B, the space factor of the electromagnetic coils can be increased and the efficiency of the coreless motor 10 (FIGS. 1A and 1B) can be improved.

Next, the electric resistances and inductances of the electromagnetic coils 100A and 100B will be described. The shapes of the electromagnetic coils 100A and 100B shown in FIG. 4E are the same as the shapes of the electromagnetic coils 100A and 100B shown in FIG. 4C and FIG. 4D. Accordingly, as described in FIG. 4C and FIG. 4D, the electric resistance of the electromagnetic coil 100A and the electric resistance of the electromagnetic coil 100B have the same value also in the state shown in FIG. 4E. As described in FIG. 4C and FIG. 4D, although the inductances caused by the effective coil areas are the same, the inductances caused by the coil end areas are different, and the inductance of the electromagnetic coil 100A is slightly different from the inductance of the electromagnetic coil 100B. However, as shown in FIG. 4E, in the state where the coil back yoke 115 and the electromagnetic coil 100A overlap each other, with respect to the inductance of the electromagnetic coil 100A, the contribution of the portion where the coil back yoke 115 and the electromagnetic coil 100A overlap each other, that is, the contribution of the effective coil area becomes dominant. The same applies to the electromagnetic coil 100B. Here, since the effective coil area of the electromagnetic coil 100A and the effective coil area of the electromagnetic coil 100B have the same shape, the inductance of the electromagnetic coil 100A and the inductance of the electromagnetic coil 100B have almost the same value. Accordingly, since the Lorentz force between the electromagnetic coil 100A and the permanent magnet 200 and the Lorentz force between the electromagnetic coil 100B and the permanent magnet 200 have the same magnitude, both are balanced, and consequently, the efficiency of the coreless motor 10 can be improved.

Figure 5:
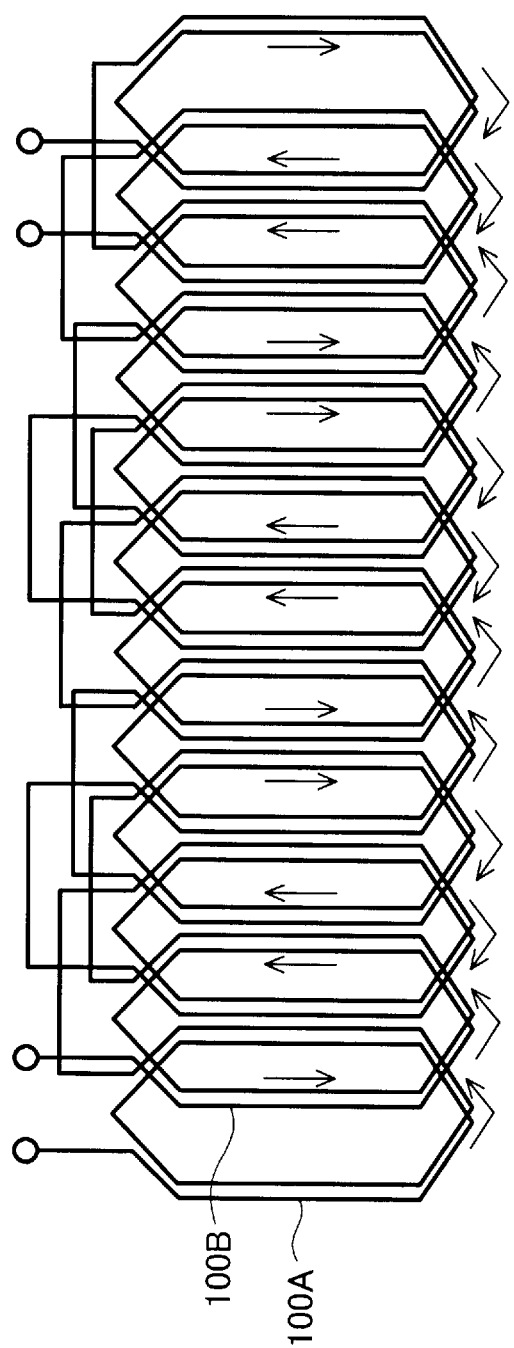
FIG. 5 is an explanatory view schematically showing wiring of the electromagnetic coils in the first embodiment.

FIG. 5 is an explanatory view schematically showing wiring of the electromagnetic coils in the first embodiment. As is apparent from FIG. 5, the winding direction of the electromagnetic coil 100A is alternately changed between the clockwise direction and the counterclockwise direction. The same applies to the electromagnetic coil 100B.

The coreless motor 10 of this embodiment includes the permanent magnet 200, the two-phase coreless (air core) electromagnetic coils 100A and 100B, and the coil back yoke 115. Each of the electromagnetic coils 100A and 100B of the respective phases includes the effective coil area and the coil end area. The effective coil areas of the electromagnetic coils 100A and 100B of the respective phases have the same shape. The effective coil areas of the electromagnetic coils 100A and 100B of the respective phases are arranged on the cylindrical surface between the permanent magnet 200 and the coil back yoke 115. The coil end area of the electromagnetic coil 100A is bent in the outside direction of the cylindrical surface. Further, the electromagnetic coils 100A and 100B of the respective phases have the same electric resistance value. Besides, the coil back yoke 115 covers the effective coil areas of the electromagnetic coils 100A and 100B of the respective phases, and does not cover the coil end areas. Thus, the inductances of the electromagnetic coils 100A and 100B of the respective phases have substantially the same value. Accordingly, since the Lorentz force between the electromagnetic coil 100A and the permanent magnet 200 and the Lorentz force between the electromagnetic coil 100B and the permanent magnet 200 have the same magnitude, both can be balanced, and consequently, the efficiency of the coreless motor 10 can be improved.

Further, as described in FIG. 4A to FIG. 4E, the electromagnetic coils 100A and 100B of the respective phases are formed such that the electromagnetic coils 100A and 100B having the same shape on the plane are bent along the cylindrical surface, and the coil end area of the electromagnetic coil 100A of the A-phase is bent in the outside direction of the cylindrical surface. Thus, the electromagnetic coils 100A and 100B of the respective phases can be easily made to have the same electric resistance value.

Besides, the interval L2 between the bundles of the conductors forming the coils in the two effective coil areas of the electromagnetic coils 100A and 100B of the respective phases is twice the thickness φ1 of the bundle of the conductor coil in the effective coil areas of the electromagnetic coils 100A and 100B. Thus, the space factor of the electromagnetic coils 100A and 100B can be increased by efficiently arranging the two-phase coils mutually between them, and the efficiency of the coreless motor 10 can be improved.

Second Embodiment

As described above, in the first embodiment, the space factor of the electromagnetic coils 100A and 100B can be increased, and the efficiency of the coreless motor 10 can be improved. However, the wire connection of the electromagnetic coil 10 is rather complicated, and at the time of manufacture, the electromagnetic coils 100A and 100B are combined one by one and are connected. Thus, there is a fear that the manufacturing process becomes rather complicated. In a second embodiment, the space factor of the electromagnetic coils 100A and 100B is further improved, the wire connection is eased, and the manufacturing process is simplified.

Figures 6A, 6B:
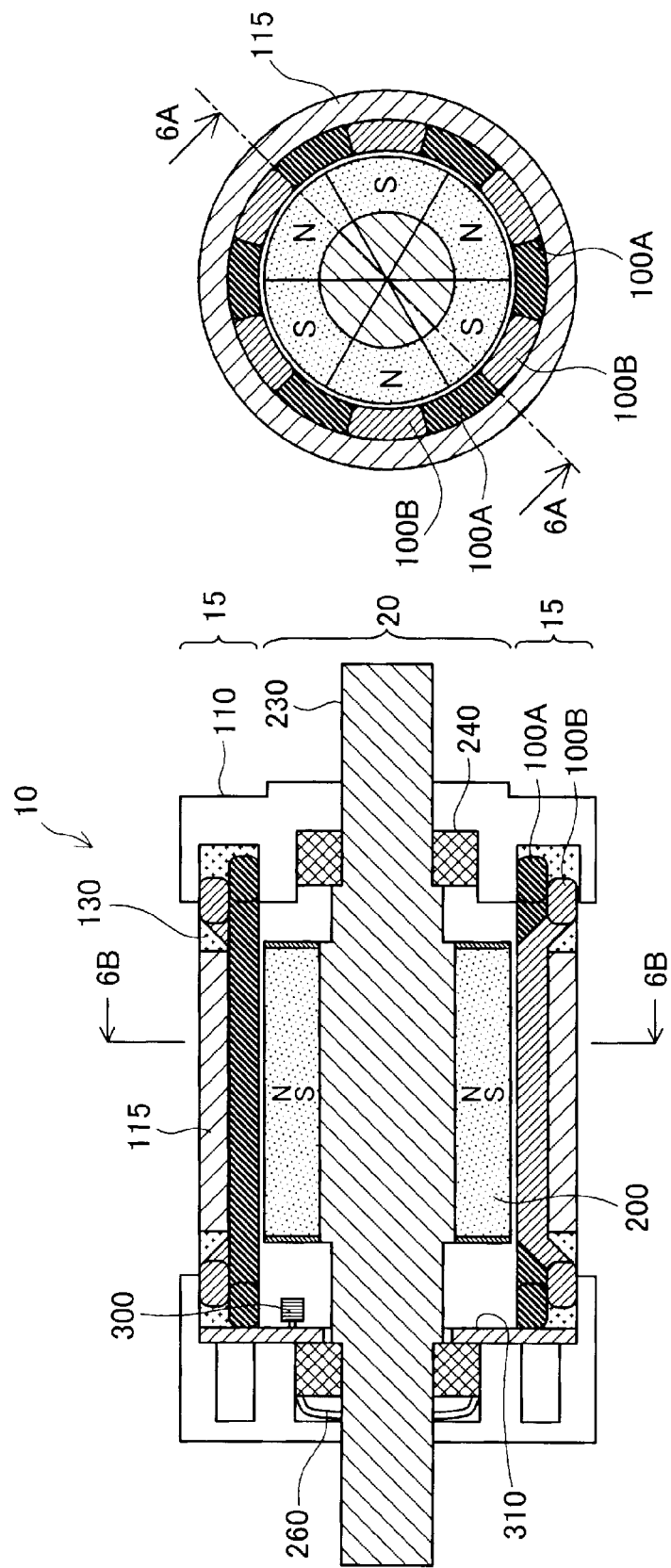
FIGS. 6A and 6B are explanatory views showing a second embodiment.

FIGS. 6A and 6B are explanatory views showing the second embodiment. FIG. 6A is a view schematically showing a section of a coreless motor 10 cut along a cut line (6A-6A of FIG. 6B) parallel to a rotation shaft 230 and viewed from a direction perpendicular to the section. FIG. 6B is a view schematically showing a section of the coreless motor 10 cut along a cut line (6B-6B of FIG. 6A) perpendicular to the rotation shaft 230 and viewed from a direction perpendicular to the section. In the second embodiment, the number of electromagnetic coils 100A and 100B is half the number in the first embodiment. Besides, in the first embodiment, although the electromagnetic coils of the same phase contact each other at the place indicated by the mark X of FIG. 3A, the second embodiment is different from the first embodiment in that there is no place where electromagnetic coils of the same phase contact each other. That is, the first and the second embodiments are different from each other in the way of winding the electromagnetic coils 100A and 100B. Incidentally, in the first embodiment, the coil end area of the electromagnetic coil 100A is bent outward (radiation direction), while in the second embodiment, the coil end area of the electromagnetic coil 100B is bent outward (radiation direction). That is, the phases of the bent electromagnetic coils are different in the A phase and the B phase. However, in the coreless motor 10, in general, the electromagnetic coil 100A of the A phase and the electromagnetic coil 100B of the B phase can be exchanged for each other.

Figure 7A:
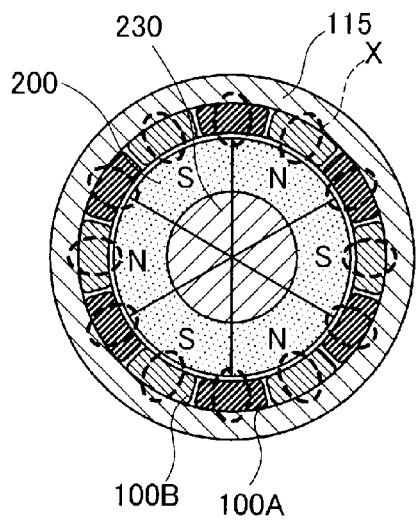
FIG. 7A is a view in which in FIG. 6B, a mark X of a broken line is given to a position corresponding to the position to which the mark X is given in FIG. 3A.

FIG. 7A is a view in which in FIG. 6B, a mark X of a broken line is given to a position corresponding to the position to which the mark X is given in FIG. 3A. In FIG. 3A, the position to which the mark X is given is the position where the two electromagnetic coils of the same phase (for example, the electromagnetic coils 100A and 100A) are adjacent. However, in FIG. 7A, the position to which the mark X is given is the center part of the coil bundle of each of the electromagnetic coils 100A and 100B. That is, in the example shown in FIG. 7A, since the position to which the mark X is given is the one electromagnetic coil, a gap does not occur. That is, since the gap does not exist, in the second embodiment, the space factor of the electromagnetic coil 100 in the area where the maximum force F is generated in the electrical angle can be improved more than the first embodiment.

Figure 7B:
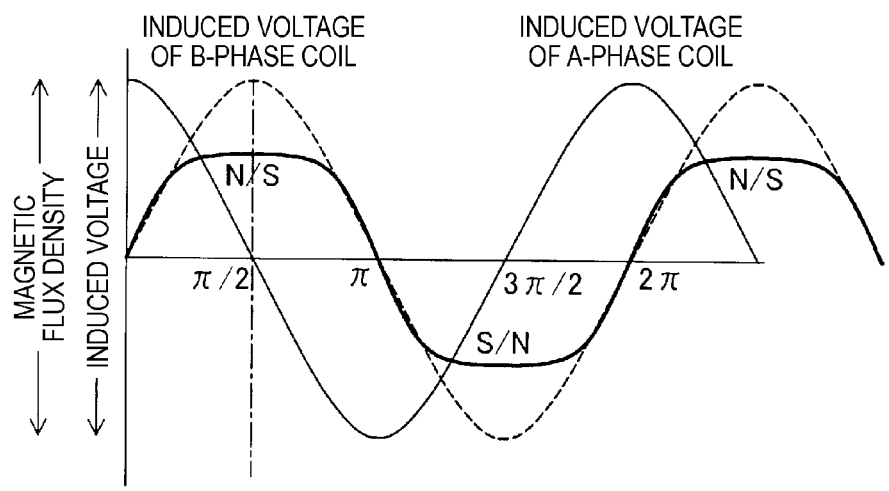
FIG. 7B is a graph showing an electrical angle of a coreless motor, induced voltages of electromagnetic coils, and a magnetic flux density detected by a magnetic sensor (FIGS. 6A and 6B).

FIG. 7B is a graph showing the electrical angle of the coreless motor, the induced voltages of the electromagnetic coils, and the magnetic flux density detected by a magnetic sensor 300 (FIGS. 6A and 6B). In FIG. 7B, a phase when a boundary part between two permanent magnets 300 coincides with a boundary between the two electromagnetic coils 100A and 100B is 0, and an electrical angle when the boundary part between the two permanent magnets 200 coincides with the center of a coil bundle of each of the electromagnetic coils 100A and 100B (state of FIG. 7A) is π/2. The magnetic flux density detected by the magnetic sensor 300 becomes maximum when the electrical angle is π/2 (3π/2), and becomes minimum when the electrical angle is 0 (π, 2π). Besides, the induced voltage of the electromagnetic coil 100B becomes maximum when the electrical angle is π/2 (3π/2), and becomes zero when the electrical angle is 0 (π, 2π). On the other hand, the induced voltage of the electromagnetic coil 100A becomes zero when the electrical angle is π/2 (3π/2), and becomes maximum when the electrical angle is 0 (π, 2π).

Figure 8:
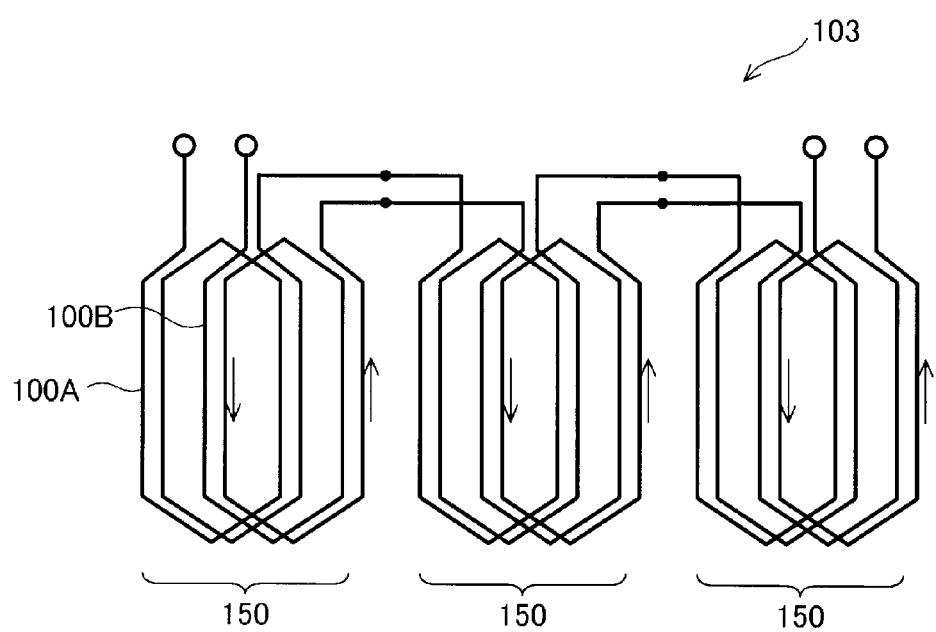
FIG. 8 is an explanatory view schematically showing wiring of the electromagnetic coils in the second embodiment.

FIG. 8 is an explanatory view schematically showing wiring of the electromagnetic coils in the second embodiment. As is apparent from the comparison with FIG. 5 (first embodiment), the wire connection of the electromagnetic coils 100A and 100B in the second embodiment is simple as compared with the first embodiment. That is, in the first embodiment, it is difficult to divide the electromagnetic coils 100A and 100B into plural coil assemblies (coil aggregates). However, in the second embodiment, the electromagnetic coils 100A and 100B can be easily divided into plural (three in this embodiment) electromagnetic coil sub-assemblies 150. That is, in the second embodiment, the electromagnetic coil sub-assemblies 150 are formed, and the electromagnetic coil sub-assemblies 150 are combined, so that the electromagnetic coil assembly 103 can be easily formed. Incidentally, in this embodiment, what is obtained by combining the electromagnetic coils 100A and 100B into a cylindrical shape is called the electromagnetic coil assembly 103. Incidentally, in an after-mentioned manufacturing process, the electromagnetic coils 100A and 100B, together with a coil back yoke 115, are molded with resin. What is obtained by molding the electromagnetic coils 100A and 100B together with the coil back yoke 115 is called an electromagnetic coil assembly with coil back yoke.

Figure 9A:
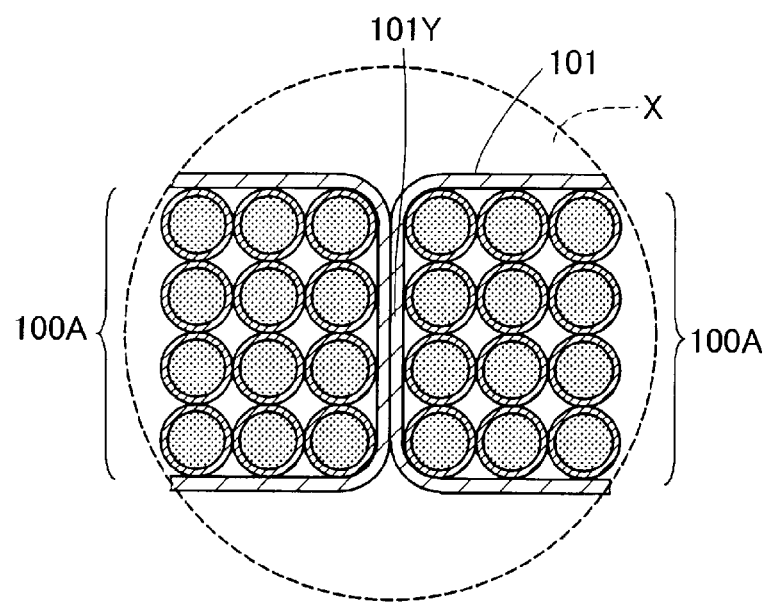
FIG. 9A is an enlarged explanatory view showing a portion to which the mark X is given in FIG. 3A.
Figure 9B:
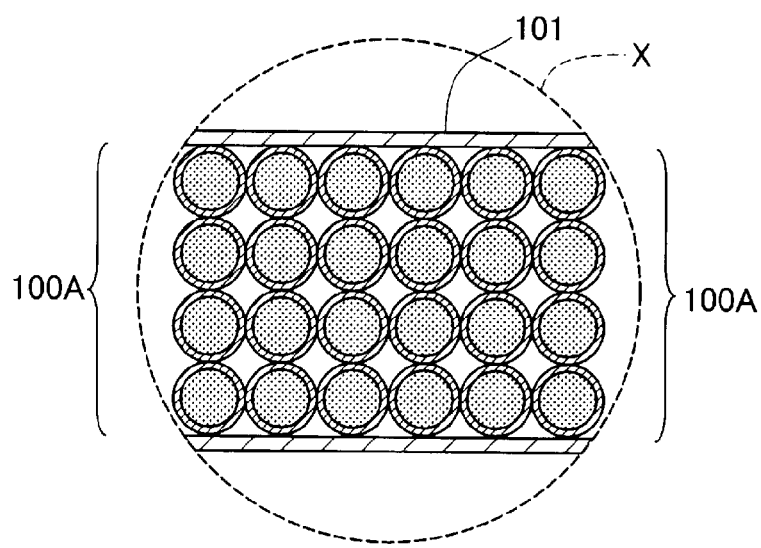
FIG. 9B is an enlarged explanatory view showing a portion to which the mark X is given in FIG. 7A.

FIG. 9A is an enlarged explanatory view showing a portion to which the mark X of FIG. 3A is given. FIG. 9B is an enlarged explanatory view showing a portion to which the mark X of FIG. 7A is given. The electromagnetic coil 100A includes an insulating thin film layer 101 at an outer edge. In the first embodiment shown in FIG. 9A, an insulating thin film layer 101Y exists in a portion where the two electromagnetic coils 100A and 100A contact each other. On the other hand, in the second embodiment shown in FIG. 9B, since the portion to which the mark X is given is formed of one electromagnetic coil, the insulating thin film layer 101Y is not formed in the portion where the insulating thin film layer 101Y exists in FIG. 9A. Since the insulating thin film layer 101Y is not a conductor, the space factor is reduced. In other words, in the second embodiment, the space factor can be improved more than the first embodiment.

FIG. 10 is an explanatory view in which the characteristics of the coreless motors of the first and the second embodiments are compared with the characteristics of a motor with core and a related art coreless motor. Here, (I) in the drawing represents the first embodiment, and (II) represents the second embodiment. The related art coreless motor is the motor in which the A-phase electromagnetic coil 100A is arranged on the inside (close to the permanent magnet 200) cylindrical surface, and the B-phase electromagnetic coil 100B is arranged on the outside (close to the coil back yoke 115) cylindrical surface. Incidentally, the cylindrical surface on which the electromagnetic coil 100A is arranged is different from the cylindrical surface on which the electromagnetic coil 100B is arranged. When compared with the motor with core having almost the same volume and the same weight and the related art coreless motor, the starting torque is large in both the first and the second embodiments. Here, when the starting torque of the motor with core is 100%, the starting torque in the first embodiment is 195%, and the starting torque in the second embodiment is 205%, and the magnitudes are about twice larger. Besides, when the first and the second embodiments are compared with each other, the starting torque of the second embodiment is slightly larger than the starting torque of the first embodiment. This is because as shown in FIG. 9A and FIG. 9B, since the insulating thin film layer 101Y does not exist in the second embodiment, the space factor is slightly larger than that of the first embodiment.

FIG. 11A is an explanatory view showing electric resistances and inductances of the electromagnetic coils in the careless motor of the comparative example. In the coreless motor of the comparative example (related art), since the cylindrical surfaces on which the electromagnetic coils 100A and 100B are arranged are different from each other, it is difficult to cause all electric characteristics of the electromagnetic coils 100A and 100B to be equal to each other. For example, as shown in FIG. 11A, even if the electric resistance of the electromagnetic coil 100A and the electric resistance of the electromagnetic coil 100B are made almost equal to each other, since the distance between the electromagnetic coil 100A and the coil back yoke 115 is different from the distance between the electromagnetic coil 100B and the coil back yoke 115, the magnitudes of the inductances of the electromagnetic coils 100A and 100B are different from each other. For example, if the electromagnetic coil 100B is closer to the coil back yoke 115 than the electromagnetic coil 100A, the inductance of the electromagnetic coil 100B becomes larger.

FIG. 11B is an explanatory view showing electric resistances and inductances of the coreless motor of the first embodiment. As is apparent from FIG. 11B, the electromagnetic coils 100A and 100B are equivalent to each other in the electric characteristics (electric resistance, inductance). If the coil back yoke 115 exists, the inductance in the effective coil area is dominant in the electromagnetic coils 100A and 100B. In the first embodiment, the shapes of the effective coil areas of the electromagnetic coils 100A and 100B are the same, and the interval between the effective coil area of the electromagnetic coil 100A and the coil back yoke 115 is equal to the interval between the effective coil area of the electromagnetic coil 100B and the coil back yoke 115. Thus, the electric resistances and the inductances of the electromagnetic coils 100A and 100B can be made the same values, and the balance of both can be improved. Incidentally, the electric resistances of the electromagnetic coils 100A and 100B can be easily made coincident with each other by causing the thicknesses and lengths of conductors forming the electromagnetic coils 100A and 100B to be equal to one another.

Hereinafter, manufacture of an electromagnetic coil assembly 104 with coil back yoke of the coreless motor 10 will be described. Here, what is obtained by molding the two electromagnetic coils 100A and 100B and the coil back yoke 115 with the resin 130 is called the electromagnetic coil assembly 104 with coil back yoke. The electromagnetic coil assembly 104 with coil back yoke includes plural coil assemblies. First, a process of manufacturing the electromagnetic coil sub-assembly 150 will be described. Next, a process of manufacturing the electromagnetic coil assembly 104 with coil back yoke from the electromagnetic coil sub-assemblies 150 will be described.

Manufacturing Process of the Coil Assembly

Figure 12A:
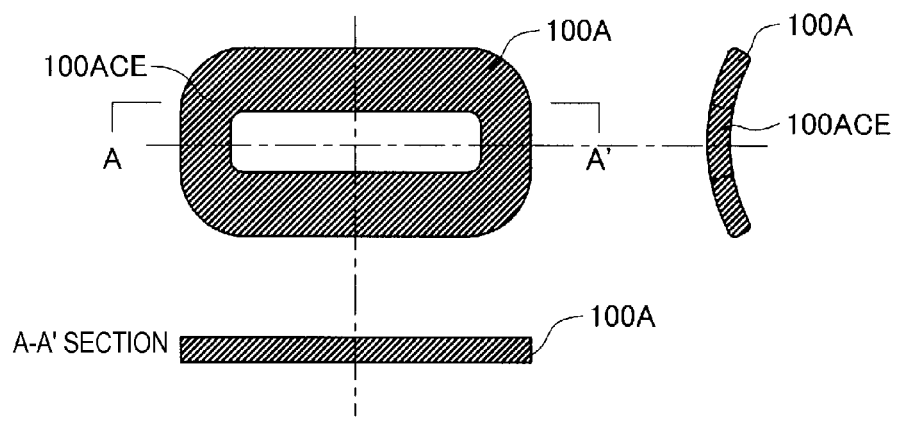
FIG. 12A is an explanatory view for explaining a forming process of an electromagnetic coil.

FIG. 12A is an explanatory view for explaining a forming process of the electromagnetic coil 100A. A conductor with insulating film forming the electromagnetic coil 100A is wound into a round corner rectangular shape, is pressed, and is formed into a shape having a shape of apart of a cylindrical area. At this time, the electromagnetic coil 100A wound into the round corner rectangular shape is pressed in the radiation direction of the cylindrical area so that the thickness of the insulating film of the conductor becomes between 30% and 100% of that before the pressing or between 20% and 100%. Incidentally, when the thickness of the insulating film becomes thin, a withstand voltage between conductors is reduced. However, since the potentials of the conductors in the same electromagnetic coil are the same potential, even if the withstand voltage between conductors becomes low, a sufficient withstand voltage is provided, and there is no problem of current leakage between the conductors in the same electromagnetic coil.

Figure 12B:
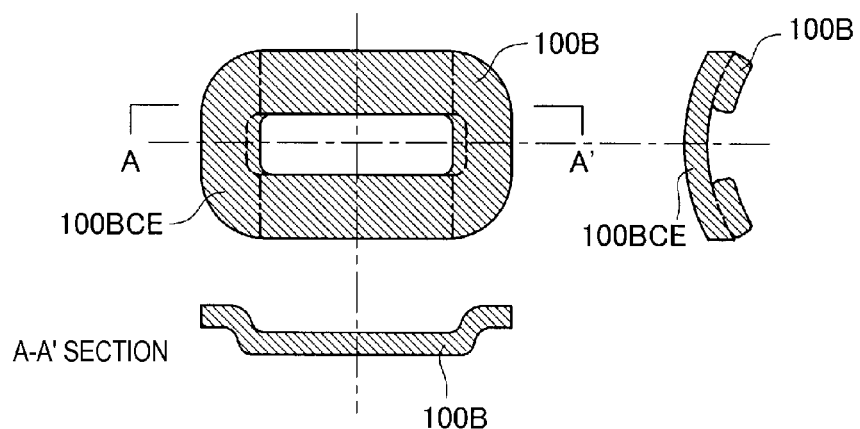
FIG. 12B is an explanatory view for explaining a forming process of an electromagnetic coil.

FIG. 12B is an explanatory view for explaining a forming process of the electromagnetic coil 100B. The forming process of the electromagnetic coil 100B is the same as the forming process of the electromagnetic coil 100A. However, the forming of the electromagnetic coil 100B is different from the forming of the electromagnetic coil 100A in that a coil end area 100BCE is bent outward from a cylindrical surface. The remainder is the same. Incidentally, the shape of the electromagnetic coil 100B before the coil end area 100BCE is bent outward from the cylindrical surface is the same as the shape of the electromagnetic coil 100A.

Figure 13A:
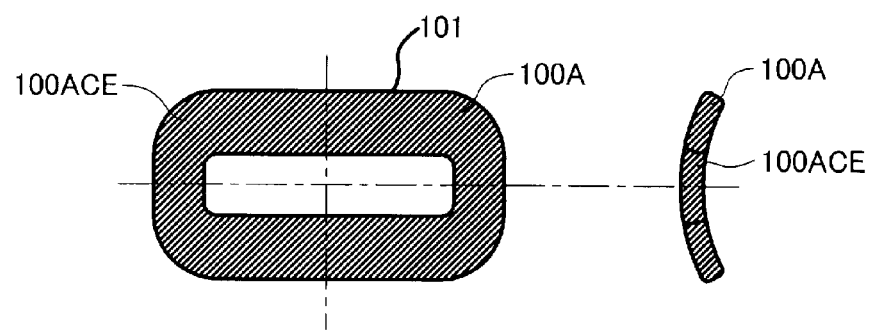
FIG. 13A is an explanatory view showing an insulating film layer forming process of the electromagnetic coil.
Figure 13B:
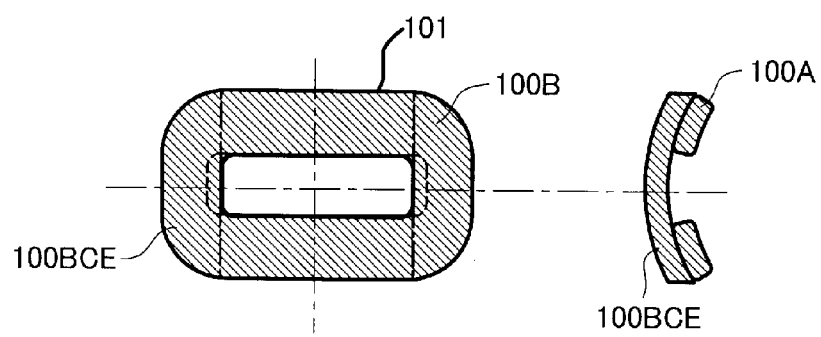
FIG. 13B is an explanatory view showing an insulating film layer forming process of the electromagnetic coil.

FIG. 13A is an explanatory view showing an insulating film layer forming process of the electromagnetic coil 100A. FIG. 13B is an explanatory view showing an insulating film layer forming process of the electromagnetic coil 100B. As described above, in the electromagnetic coil 100A or the electromagnetic coil 100B, since the potential is the same, even if the thickness of the insulating film of the conductor becomes thin, and the withstand voltage between the conductors is reduced, there is no problem of current leakage between the conductors in the same electromagnetic coil. However, when the coreless motor 10 is assembled, since the electromagnetic coils 100A and 100B contact each other, in view of a high withstand voltage (1.5 kV or higher) characteristic between the electromagnetic coil 100A, 100B and the coil back yoke 115 according to a public institution, it is preferable to raise the withstand voltage between the electromagnetic coils 100A and 100B. In this embodiment, the insulating thin film layer 101 is formed on the whole area of the electromagnetic coils 100A and 100B, and the withstand voltage is ensured. As a material of the insulating thin film layer 101, for example, silane coupling material containing titanium oxide, parylene, epoxy, silicone or urethane can be used.

Figure 14:
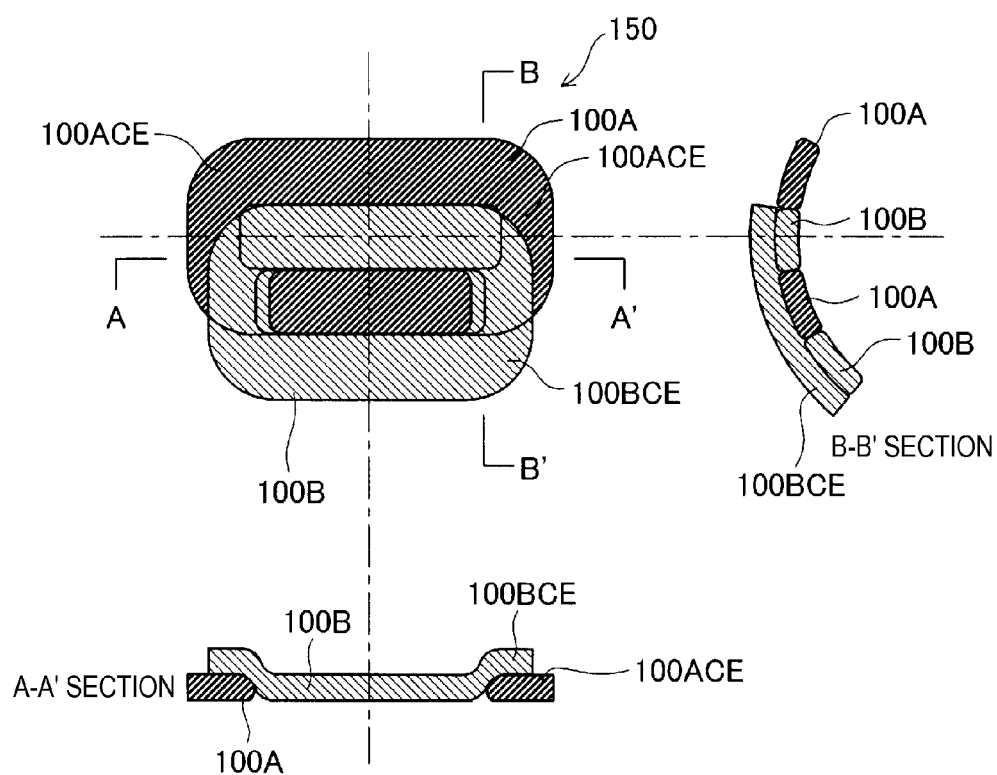
FIG. 14 is an explanatory view showing an assembling process of the electromagnetic coils.

FIG. 14 is an explanatory view showing an assembling process of the electromagnetic coils 100A and 100B. Incidentally, in FIG. 14, the insulating thin film layer 101 (FIG. 13A, FIG. 13B) is not shown. The electromagnetic coil 100B is fitted so that the effective coil area of the electromagnetic coil 100B is fitted between two effective coil areas of the center parts of the electromagnetic coil 100A from the outer peripheral side in the radiation direction of the cylindrical area where the electromagnetic coil 100A is arranged. As a result, the electromagnetic coil sub-assembly 150 (coil sub-aggregate) is formed. The electromagnetic coil sub-assembly 150 forms a part of the cylindrical surface of the electromagnetic coil 100. In a portion close to the bottom of the cylindrical area, the coil end area 100BCE of the electromagnetic coil 100B is bent to the outer peripheral side in the radiation direction of the cylindrical area where the electromagnetic coil 100B is arranged. A part of a coil end area 100ACE of the electromagnetic coil 100A overlaps a part of the coil end area 100BCE of the electromagnetic coil 100B.

Manufacture (First Method) of Electromagnetic Coil Assembly with Coil Back Yoke

Figures 15A, 15B:
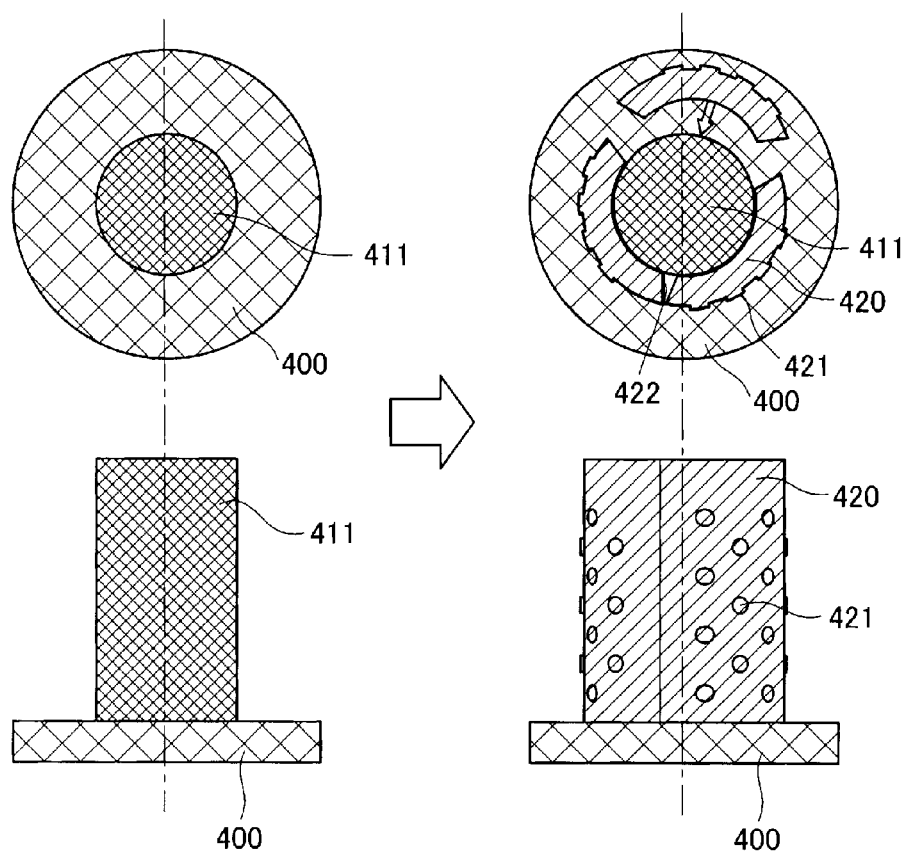
FIGS. 15A and 15B are explanatory views (No. 1) showing a part of a forming process of an electromagnetic coil assembly.

FIGS. 15A and 15B are explanatory views (No. 1) showing a part of a forming process of the electromagnetic coil assembly. In the process shown in FIG. 15A, a base table 400 including a core pin 411 is prepared. The base table 400 has a substantially disk shape. The core pin 411 is a substantially cylindrical member and is arranged at the center of the base table 400. The base table 400 and the core pin 411 may be integrally formed. In the process shown in FIG. 15B, three inner dies 420 are arranged on the outer peripheral part of the core pin 411. The three inner dies 420 form a substantially cylindrical shape. The inner die 420 includes projections 421 on the outside surface. The height of the projection 421 is preferably 10 to 20 μm and may be 10 to 100 μm. Besides, the inner die 420 has a relation of (inner periphery)/(radius of curvature of the inner periphery)<(outer periphery)/(radius of curvature of the outer periphery). Thus, when the inner dies 420 are arranged on the outer peripheral part of the core pin 411, a wedge-shape space 422 is formed at a connection portion of the two inner dies 420. The wedge-shape space 422 is provided so that after the core pin 411 is drawn, the inner die 420 is moved in the center direction and the detachment is facilitated. Incidentally, in this embodiment, although the inner die 420 is divided into three parts, the inner die may be divided into an arbitrary number of parts other than the three parts, such as two parts or four parts.

Figures 16A, 16B:
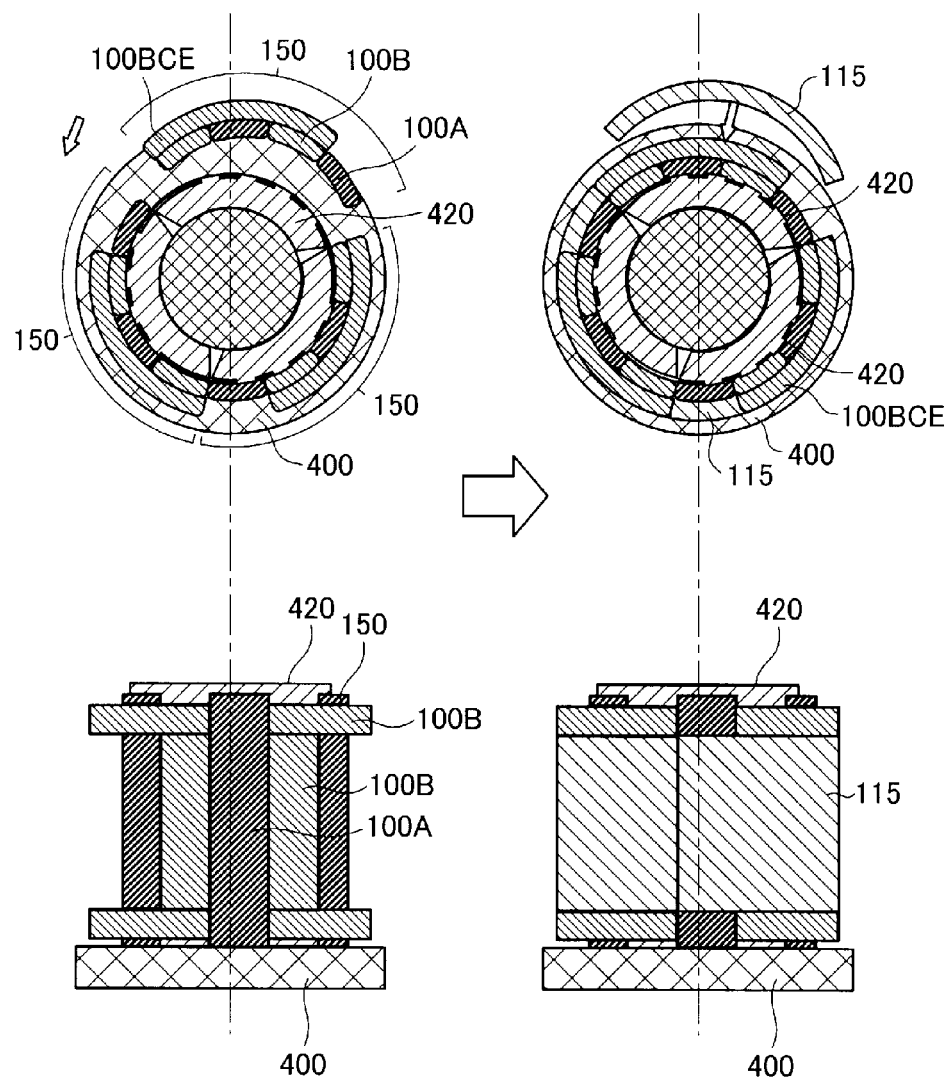
FIGS. 16A and 16B are explanatory views (No. 2) showing a part of the forming process of the electromagnetic coil assembly.

FIGS. 16A and 16B are explanatory views (No. 2) showing a part of the forming process of the electromagnetic coil assembly. In the process shown in FIG. 15A, the electromagnetic coil sub-assembly 150 is arranged outside the inner die 420. In this embodiment, three electromagnetic coil sub-assemblies 150 form a substantially cylindrical shape. In the process shown in FIG. 16B, the coil back yoke 115 is arranged outside the effective coil areas of the electromagnetic coils 100A and 100B. In this embodiment, the coil back yoke 115 is divided in three parts. Incidentally, the number of divided parts may be two or more.

Figure 17:
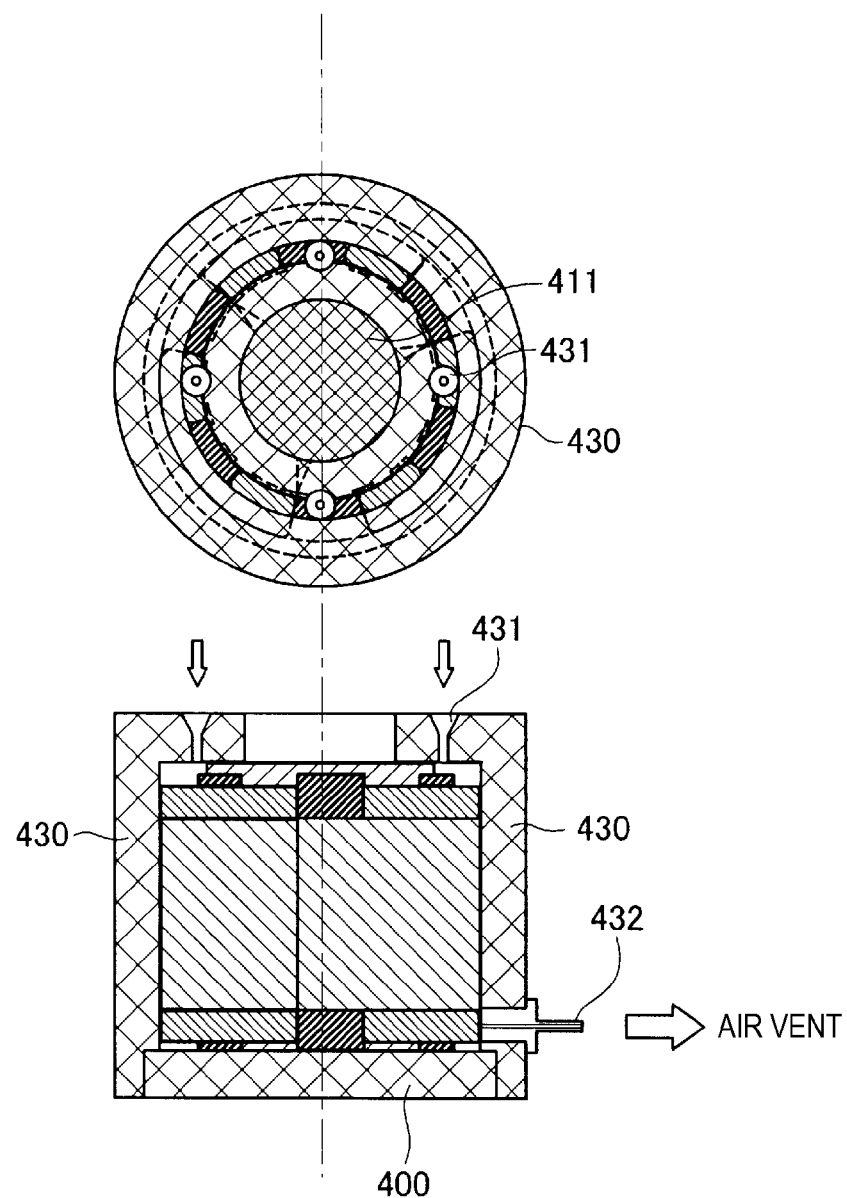
FIG. 17 is an explanatory view (No. 3) showing a part of the forming process of the electromagnetic coil assembly.

FIG. 17 is an explanatory view (No. 3) showing a part of the forming process of the electromagnetic coil assembly. In the process shown in FIG. 17, an outer die 430 is arranged outside the coil back yoke 115. The outer die 430 includes a resin injection port 431 and an air vent port 432. Incidentally, in FIG. 17, the illustration of the air vent port 432 is omitted in the plan view shown above.

Figures 18A, 18B:
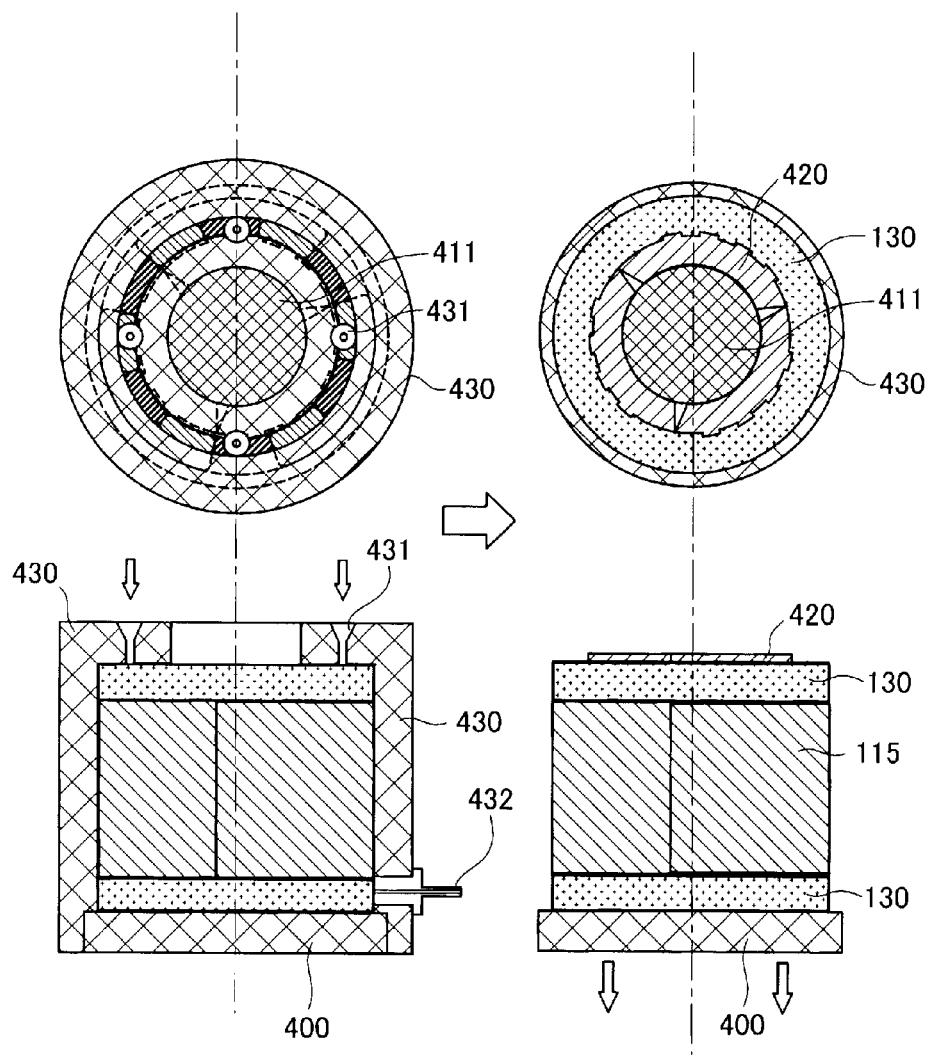
FIGS. 18A and 18B are explanatory views (No. 4) showing a part of the forming process of the electromagnetic coil assembly.

FIGS. 18A and 18B are explanatory views (No. 4) showing a part of the forming process of the electromagnetic coil assembly. In the process shown in FIG. 18A, the high temperature resin 130 is injected from the resin injection port 431 of the high temperature die, and then, the shaping dies are subjected to a defoaming process by a vacuum pump. When the resin 130 is solidified, the outer die 430 is detached. FIG. 18B shows a state where the outer die 430 is detached. Next, the base table 400 and the core pin 411 are detached in the state shown in FIG. 18B.

Figures 19A, 19B:
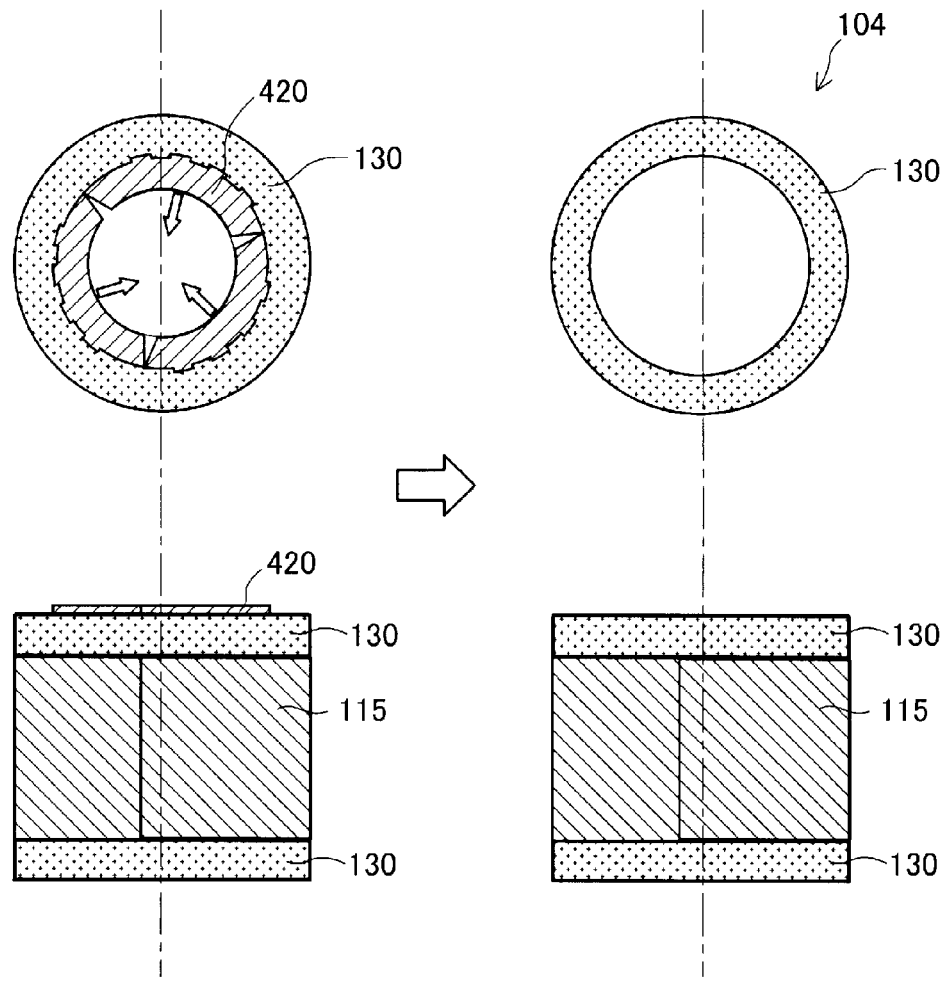
FIGS. 19A and 19B are explanatory views (No. 5) showing a part of the forming process of the electromagnetic coil assembly.
Figures 20A, 20B:
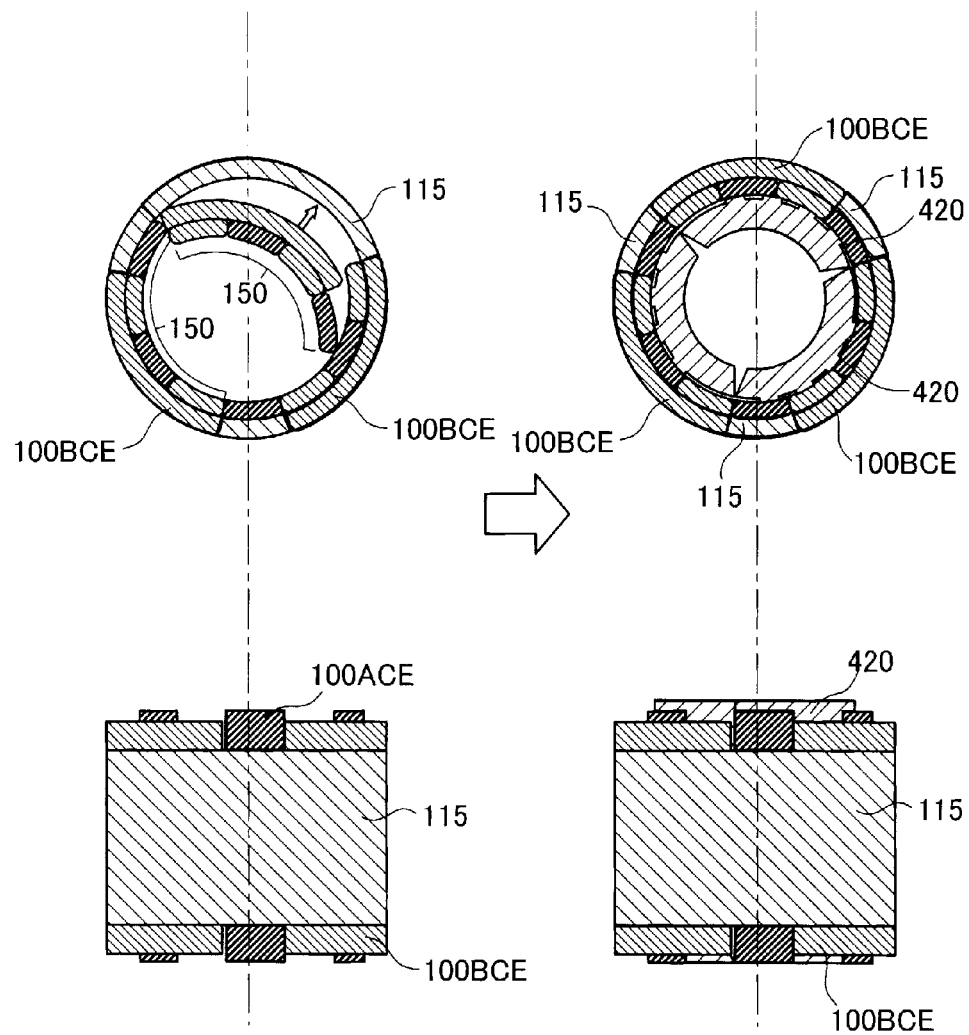
FIGS. 20A and 20B are explanatory views (No. 1) showing an example of a case where formation of an electromagnetic coil assembly is performed in another process.

FIGS. 19A and 19B are explanatory views (No. 5) showing a part of the forming process of the electromagnetic coil assembly. FIG. 19A shows a state where the base table 400 and the core pin 411 are detached. In the state shown in FIG. 19A, the three inner dies 420 are respectively moved in the direction in which the core pin 411 existed and are detached, so that the electromagnetic coil assembly 103 is formed. FIG. 19B shows the state where the inner dies 420 are detached. As stated above, the electromagnetic coil assembly 104 with coil back yoke can be formed from the electromagnetic coil sub-assemblies 150 in the process shown in FIG. 15A to FIG. 19B.
Manufacture (Second Method) of Electromagnetic Coil Assembly with Coil Back Yoke FIGS. 20A and 20B are explanatory views (No. 1) showing an example of a case where formation of an electromagnetic coil assembly is performed in another process. In the process described before, after the electromagnetic coil sub-assemblies 150 are combined, the coil back yoke 115 is attached. On the other hand, in this process, a cylindrical coil back yoke 115 is previously prepared, and electromagnetic coil sub-assemblies 150 are attached to the cylindrical inside of the coil back yoke 115.

In the process shown in FIG. 20A, the electromagnetic coil sub-assemblies 150 are inserted into the cylindrical inside of the coil back yoke 115, and are fitted to the cylindrical inner surface of the coil back yoke 115. At this time, the electromagnetic coil sub-assemblies 150 are arranged so that the coil back yoke 115 is fitted between two coil end areas 100BCE of the electromagnetic coil 100B of the electromagnetic coil sub-assembly 150. Next, in the process shown in FIG. 20B, an inner die 420 divided in three parts is arranged inside the electromagnetic coil sub-assemblies 150.

Figures 21A, 21B:
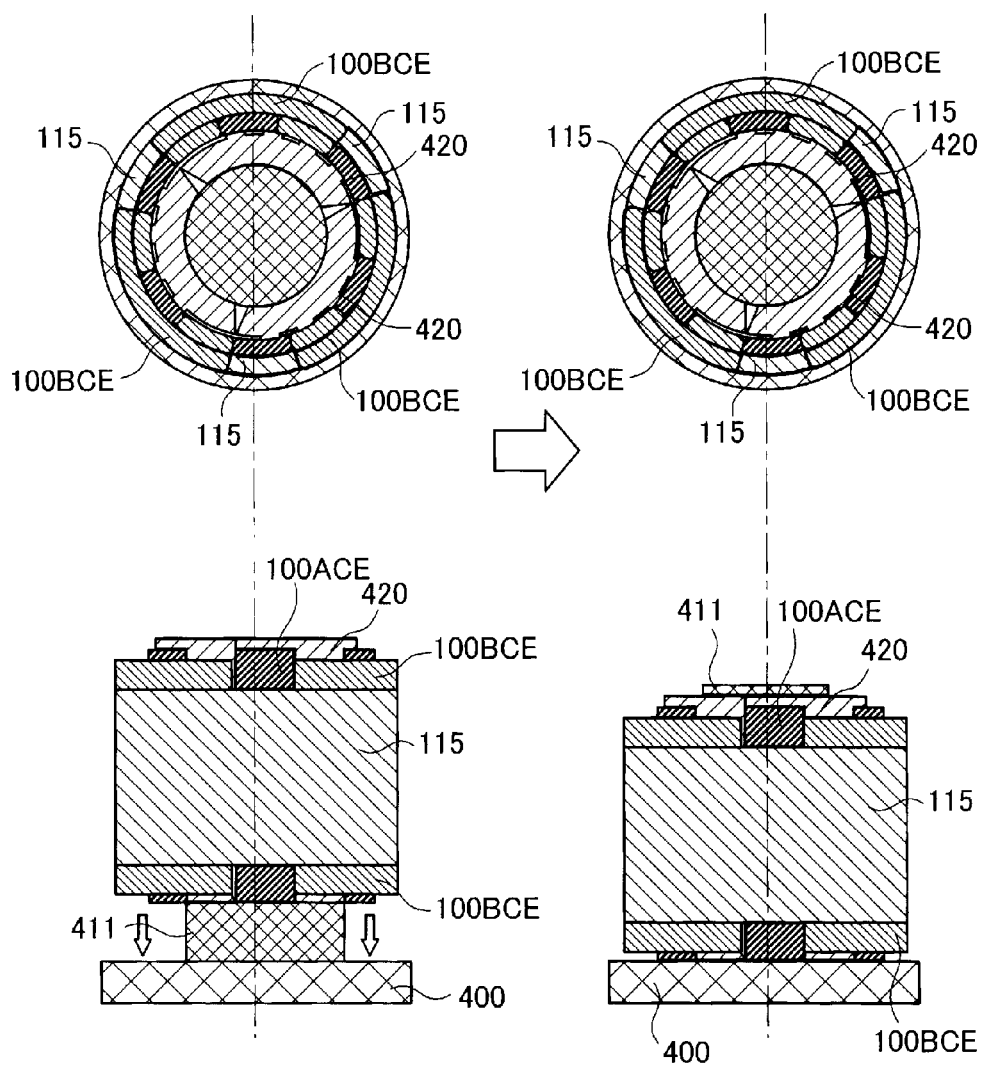
FIGS. 21A and 21B are explanatory views (No. 2) showing the example of the case where the formation of the electromagnetic coil assembly is performed in the another process.

FIGS. 21A and 21B are explanatory views (No. 2) showing the example of the case where the formation of the electromagnetic coil assembly is performed in the another process. In the process shown in FIG. 21A, a core pin 411 is inserted into the inside of the inner die 420. Incidentally, a base table 400 is provided at one end of the core pin 411. FIG. 21B is an explanatory view showing a state where the core pin 411 is inserted.

Figure 22:
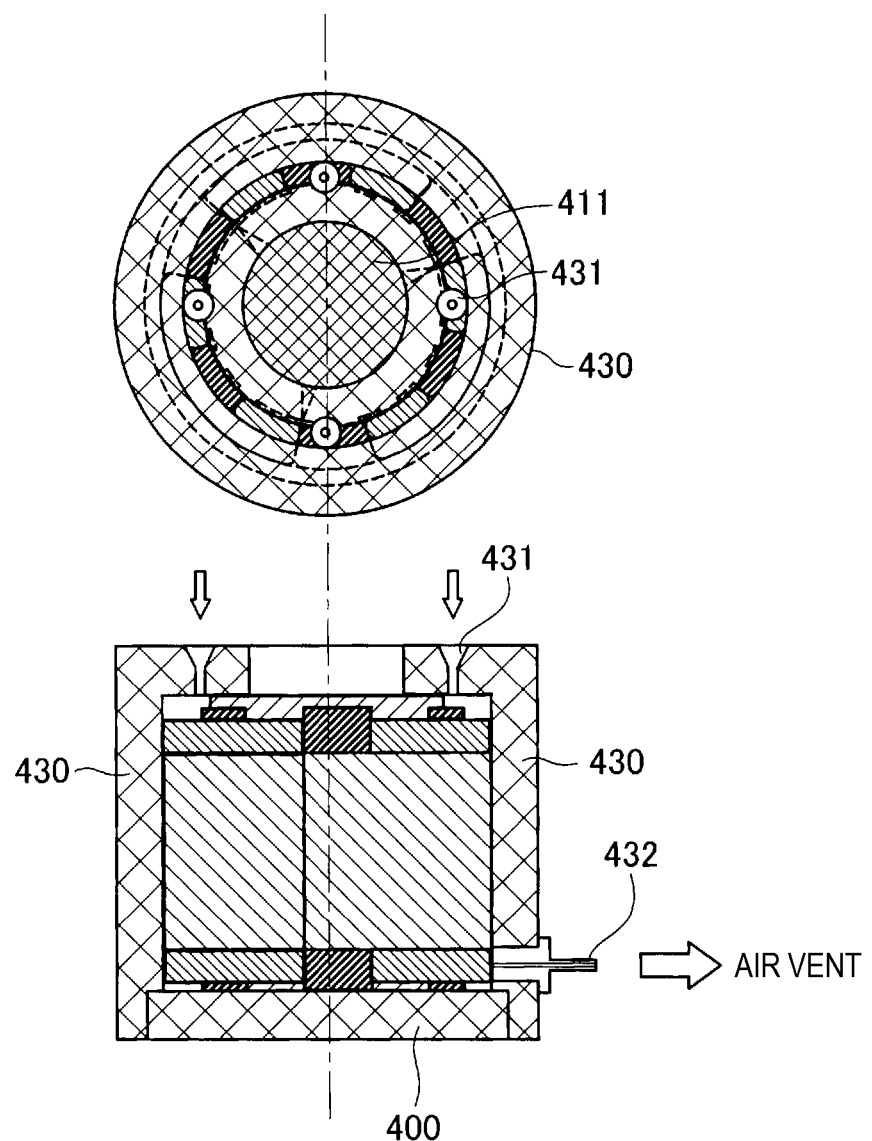
FIG. 22 is an explanatory view (No. 3) showing the example of the case where the formation of the electromagnetic coil assembly is performed in the another process.

FIG. 22 is an explanatory view (No. 3) showing the example of the case where the formation of the electromagnetic coil assembly is performed in the another process. FIG. 22 is the same as FIG. 17, and an outer die 430 including a resin injection port 431 and an air vent port 432 is arranged outside the coil back yoke 115.

Figures 23A, 23B:
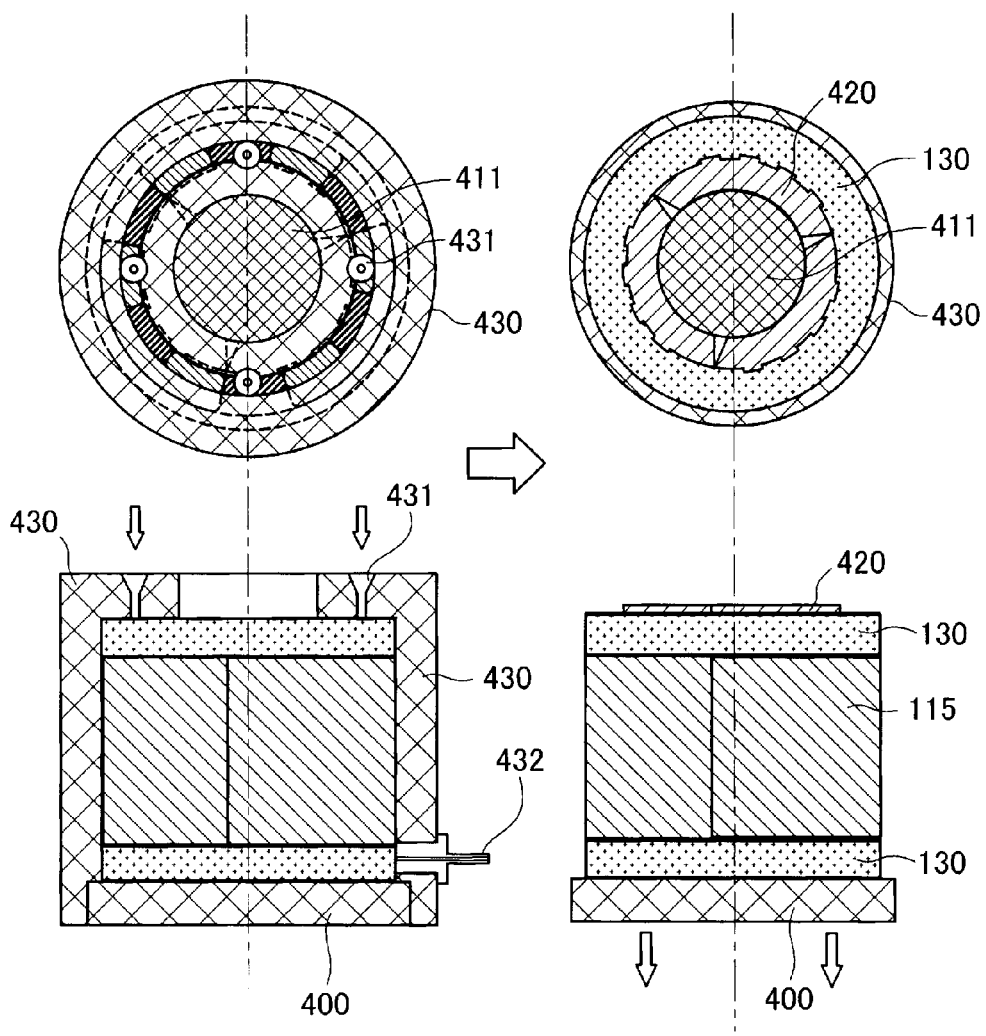
FIGS. 23A and 23B are explanatory views (No. 4) showing the example of the case where the formation of the electromagnetic coil assembly is performed in the another process.

FIGS. 23A and 23B are explanatory views (No. 4) showing the example of the case where the formation of the electromagnetic coil assembly is performed in the another process. FIG. 23A is the same as FIG. 18A. In the process shown in FIG. 23A, a high temperature resin 130 is injected from the resin injection port 431 of the high temperature die, and then, the shaping dies are subjected to a defoaming process by a vacuum pump. When the resin 130 is solidified, the outer die 430 is detached. FIG. 23B shows a state where the outer die 430 is detached. Next, the base table 400 and the core pin 411 are detached in the state shown in FIG. 23B.

Figures 24A, 24B:
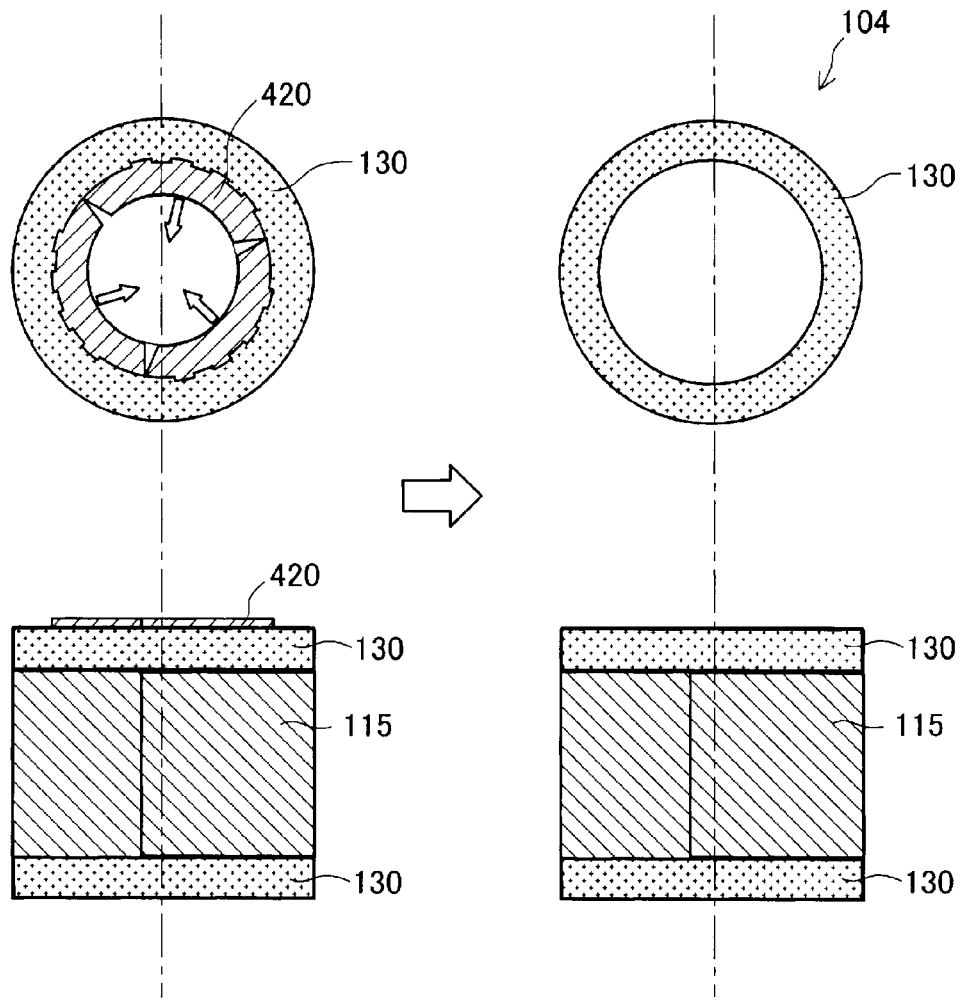
FIGS. 24A and 24B are explanatory views (No. 5) showing the example of the case where the formation of the electromagnetic coil assembly is performed in the another process.
Figure 25:
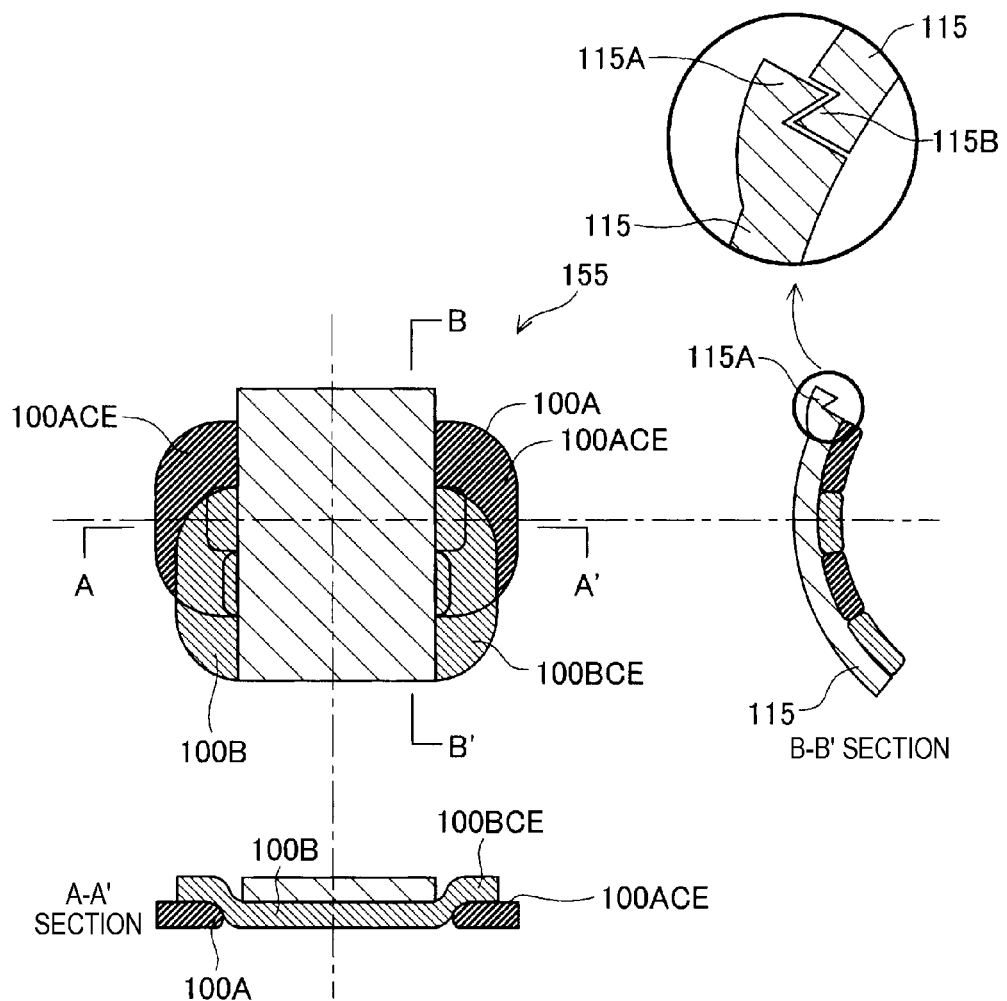
FIG. 25 is an explanatory view showing an electromagnetic coil sub-assembly in a case where a forming process of an electromagnetic coil assembly is performed in still another process.

FIGS. 24A and 24B are explanatory views (No. 5) showing the example of the case where the formation of the electromagnetic coil assembly is performed in the another process. FIGS. 24A and 24B are the same as FIGS. 19A and 19B. FIG. 24A shows a state where the base table 400 and the core pin 411 are detached. In the state shown in FIG. 24A, the three inner dies 420 are respectively moved in the direction in which the core pin 411 existed and are detached, so that the electromagnetic coil assembly 103 is formed. FIG. 24B shows a state where the inner dies 420 are detached. As stated above, also in the process shown in FIG. 20A to FIG. 24B, the electromagnetic coil assembly 104 with coil back yoke can be formed from the electromagnetic coil sub-assemblies 150. Incidentally, when the electromagnetic coil assembly 104 with coil back yoke is manufactured in the process shown in FIG. 15A to FIG. 19B, the coil back yoke 115 is made to have the division structure. On the other hand, when the electromagnetic coil assembly 104 with coil back yoke is manufactured in the process shown in FIG. 20A to FIG. 24B, the coil back yoke 115 may not be made to have the division structure.
Manufacture (Third Method) of Electromagnetic Coil Assembly with Coil Back Yoke FIG. 25 is an explanatory view showing an electromagnetic coil sub-assembly 155 in a case where a forming process of an electromagnetic coil assembly is performed in still another process. The electromagnetic coil sub-assembly 155 with coil back yoke includes a coil back yoke 115 in addition to electromagnetic coils 100A and 100B. The electromagnetic coil sub-assembly 155 with coil back yoke can be easily formed by connecting an electromagnetic coil sub-assembly 150 and the coil back yoke 115. Incidentally, since integration is performed by molding with a resin 130 in a later process, the connection between the electromagnetic coil sub-assembly 150 and the coil back yoke 115 may not be strong. The coil back yoke 115 is arranged to overlap the effective coil areas of the electromagnetic coils 100A and 100B. Coil end areas 100ACE and 100BCE of the electromagnetic coils 100A and 100B do not overlap the coil back yoke 115. A key 115A is formed on one end of the coil back yoke 115 in the rotation direction, and a groove 115B is formed on the other end. The key 115A of the coil back yoke 115 is hooked in the groove 115B of the adjacent coil back yoke 115, so that the coil back yoke 115 can be strongly engaged.

Figures 26A, 26B:
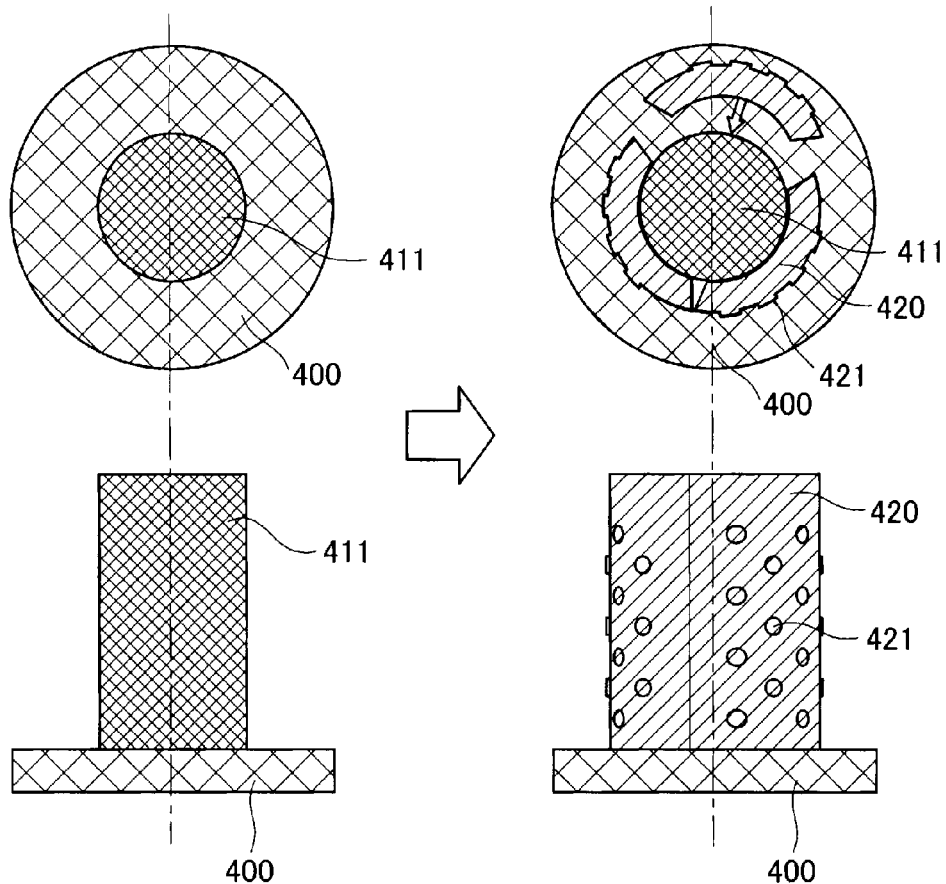
FIGS. 26A and 26B are explanatory views (No. 1) showing an example of the case where the formation of the electromagnetic coil assembly is performed in the still another process.

FIGS. 26A and 26B are explanatory views (No. 1) showing an example of a case where formation of the electromagnetic coil assembly is performed in still another process. FIGS. 26A and 26B are the same as FIGS. 15A and 15B. Since the process performed in FIGS. 26A and 26B is the same as the process performed in FIGS. 15A and 15B, the description thereof is omitted.

Figures 27A, 27B:
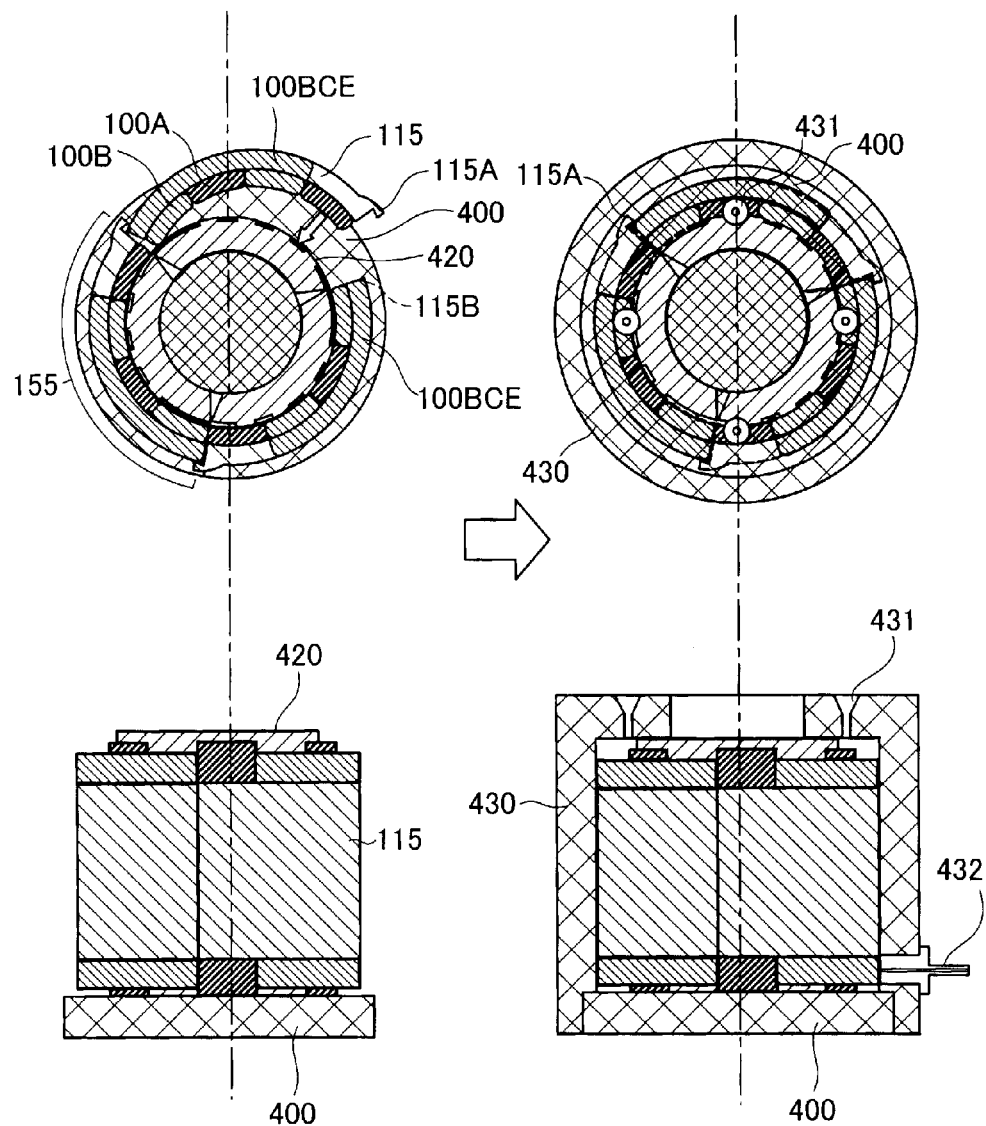
FIGS. 27A and 27B are explanatory views (No. 2) showing the example of the case where the formation of the electromagnetic coil assembly is performed in the still another process.

FIGS. 27A and 27B are explanatory views (No. 2) showing the example of the case where the formation of the electromagnetic coil assembly is performed in the still another process. In the process shown in FIG. 27A, while the key 115A of the coil back yoke 115 is engaged with the groove 115B (concealed by the coil end area 100BCE of the electromagnetic coil 100B in the drawing), the electromagnetic coil sub-assembly 155 with coil back yoke is arranged around an inner die 420. FIG. 27B is an explanatory view showing a state where an outer die 430 is further arranged after the electromagnetic coil sub-assembly 155 is arranged. In FIG. 27B, although a portion of the key 115A swells, FIG. 27B is the same as FIG. 17 except for this point.

Figures 28A, 28B:
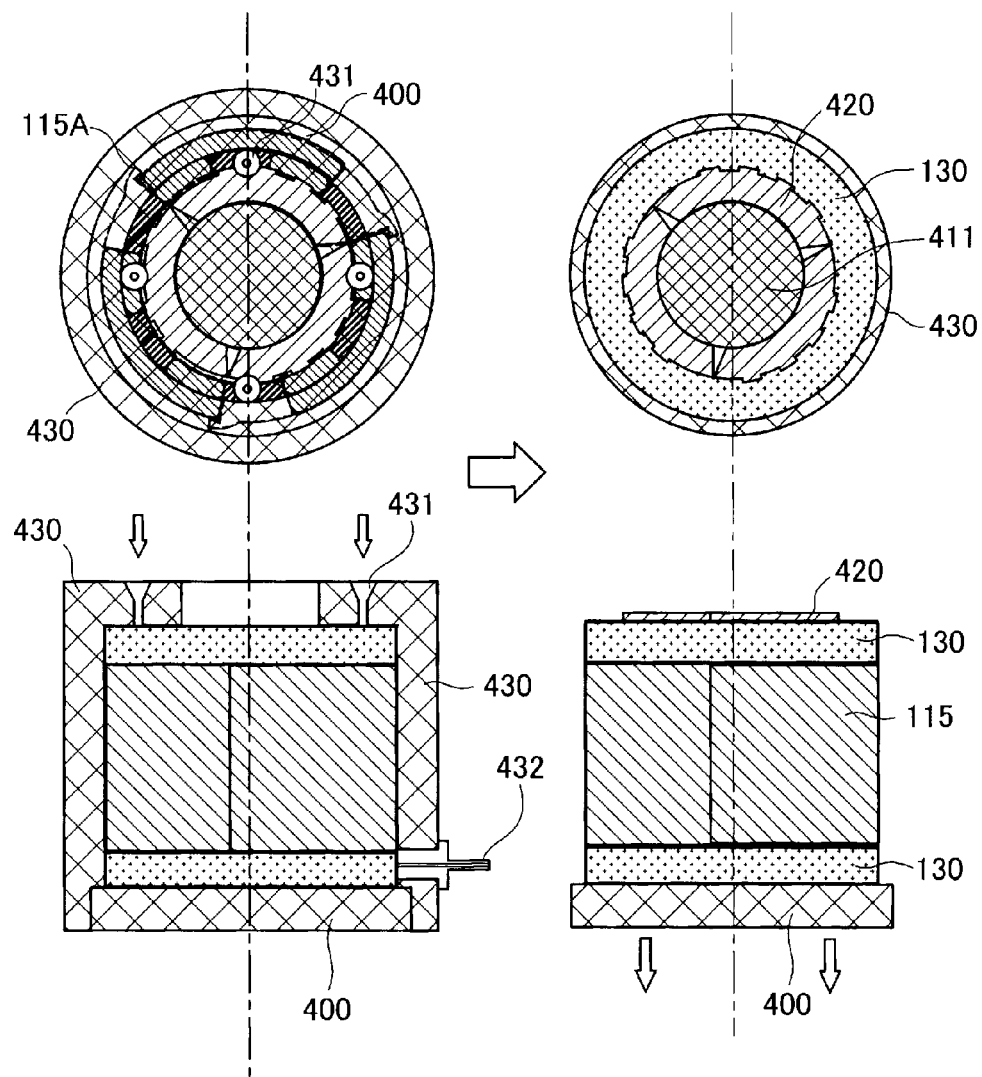
FIGS. 28A and 28B are explanatory views (No. 3) showing the example of the case where the formation of the electromagnetic coil assembly is performed in the still another process.

FIGS. 28A and 28B are explanatory views (No. 3) showing the example of the case where the formation of the electromagnetic coil assembly is performed in the still another process. In the process shown in FIG. 28A, a high temperature resin 130 is injected from a resin injection port 431 of the high temperature die, and then, the shaping dies are subjected to a defoaming process by a vacuum pump. The swelling of the portion of the key 115A shown in FIG. 27B is reduced by being embedded with the resin 130. FIG. 28B shows a state where the outer die 430 is detached. Next, a base table 400 and a core pin 411 are detached in the state shown in FIG. 28B.

Figures 29A, 29B:
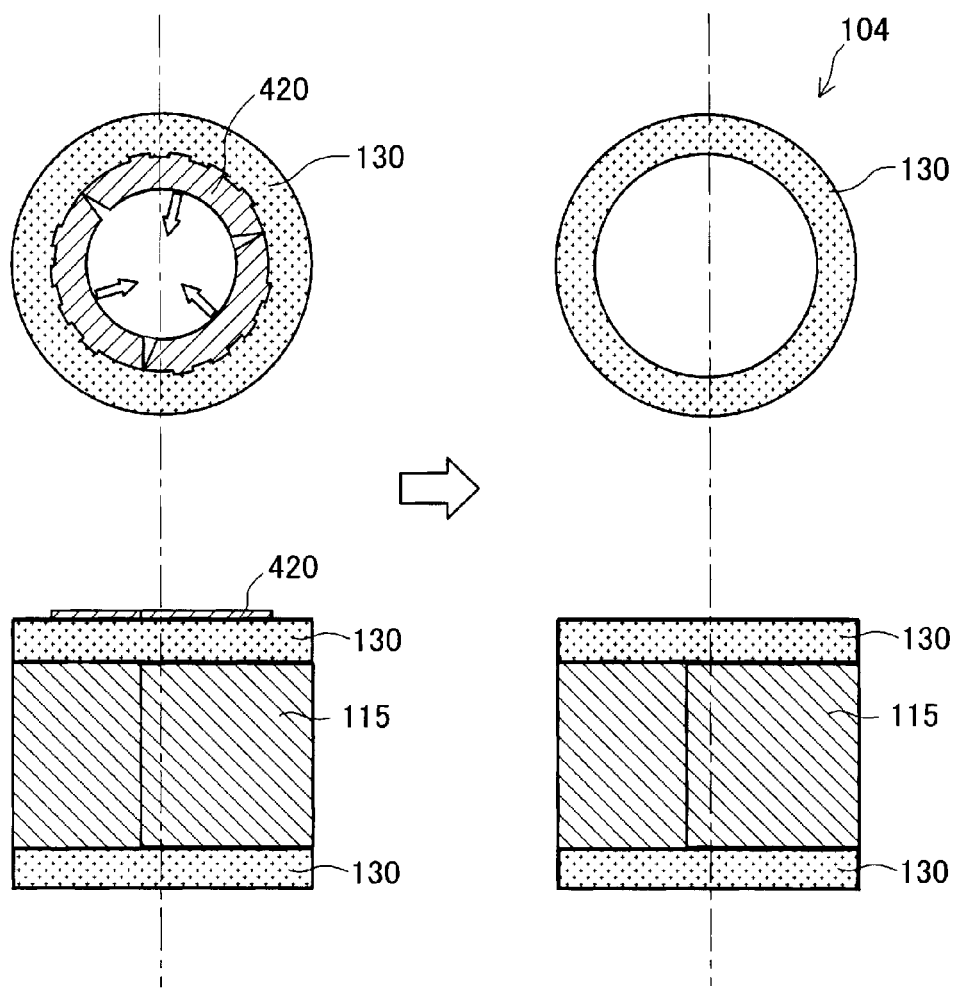
FIGS. 29A and 29B are explanatory views (No. 4) showing the example of the case where the formation of the electromagnetic coil assembly is performed in the still another process.

FIGS. 29A and 29B are explanatory views (No. 4) showing the example of the case where the formation of the electromagnetic coil assembly is performed in the still another process. Since this process is the same as the process shown in FIGS. 19A and 19B, the description thereof is omitted.

According to the second embodiment, the electromagnetic coil sub-assemblies 150 or the electromagnetic coil sub-assemblies 155 with coil back yoke are manufactured and are combined, and then they are molded with the resin 130, so that the electromagnetic coil assembly 104 with coil back yoke can be easily manufactured. As described above, the mold process can be performed in various methods. Besides, the electromagnetic coils 100A and 100B of the coreless motor 10 including the electromagnetic coil assembly 104 with coil back yoke has a high space factor, and has a high starting torque as described in FIG. 10.

Third Embodiment

Figures 30A, 30B:
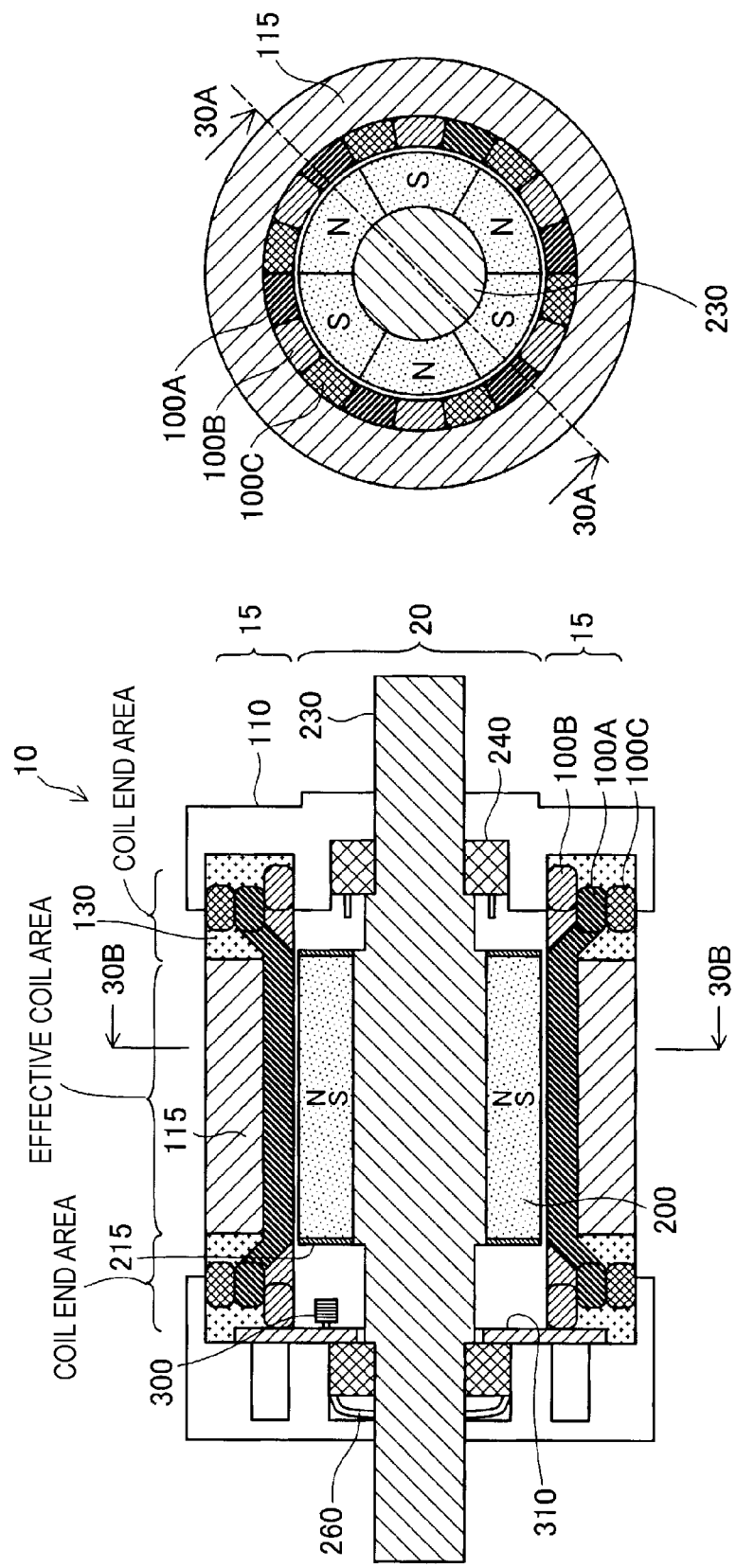
FIGS. 30A and 30B are explanatory views showing a third embodiment.

FIGS. 30A and 30B are explanatory views showing a third embodiment. FIG. 30A is a view schematically showing a section of a coreless motor 10 cut along a cut line (30A-30A of FIG. 30B) parallel to a rotation shaft 230 and viewed from a direction perpendicular to the section. FIG. 30B is a view schematically showing a section of the coreless motor 10 cut along a cut line (30B-30B of FIG. 30A) perpendicular to the rotation shaft 230 and viewed from a direction perpendicular to the section. In the first and the second embodiments, the description is made on the case where the electromagnetic coil has two phases. The third embodiment is different from the foregoing embodiments in that the electromagnetic coil has three phases. Incidentally, in the case of the three phases, electromagnetic coils 100A, 100B and 100C of the respective phases may be connected in star connection or delta connection. Alternatively, the electromagnetic coils 100A, 100B and 100C may be independent of each other. In the third embodiment, the effective coil areas of the electromagnetic coils 100A, 100B and 100C are on the same cylindrical surface, and the coil end areas of the two electromagnetic coils 100A and 100C are bent in the outside direction from the cylindrical surface on which the effective coil areas are arranged. Incidentally, a structure may be such that the electromagnetic coil 100A is bend in the inside direction from the cylindrical surface on which the effective coil area is arranged, and the electromagnetic coil 100C is bent in the outside direction from the cylindrical surface on which the effective coil area is arranged. Incidentally, the electromagnetic coils 100A, 100B 100C can be exchanged for each other.

Figure 31:
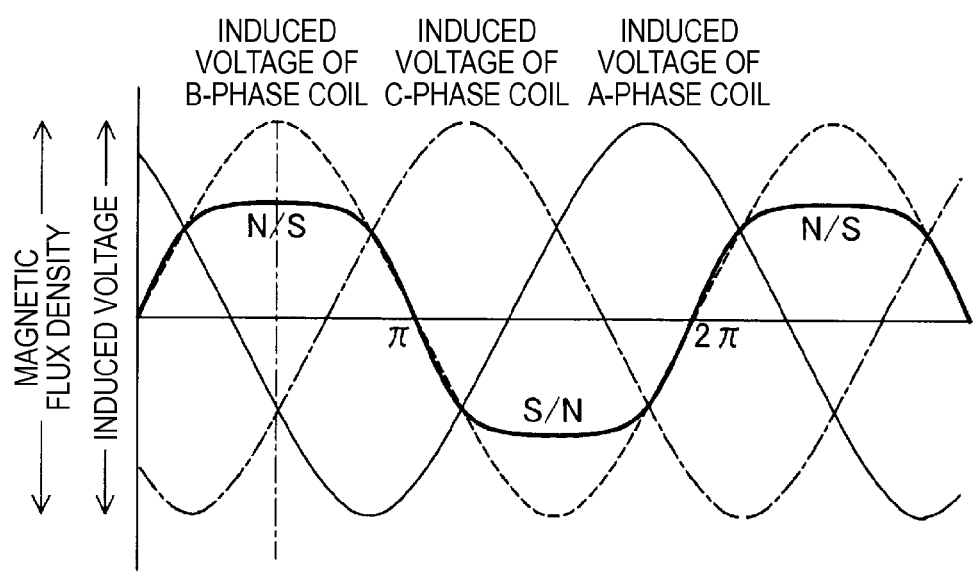
FIG. 31 is a graph showing an electrical angle of a coreless motor and a magnetic flux density, induced voltages of electromagnetic coils, and a magnetic flux density detected by a magnetic sensor 300 (FIG. 30A).

FIG. 31 is a graph showing an electrical angle of a coreless motor, induced voltages of electromagnetic coils, and a magnetic flux density detected by a magnetic sensor 300 (FIG. 30A). The magnetic flux density detected by the magnetic sensor 300 becomes maximum when the electrical angle is π/2 (3π/2), and becomes minimum when the electrical angle is 0 (π, 2π). Besides, the induced voltage of the electromagnetic coil 100B becomes maximum when the electrical angle is π/2 (3π/2) and becomes zero when the electrical angle is 0 (π, 2π). On the other hand, the induced voltage of the electromagnetic coil 100A becomes maximum when the electrical angle is 5π/6 (11π/6), and becomes zero when the electrical angle is π/3 (4π/3). The induced voltage of the electromagnetic coil 100C becomes maximum when the electrical angle is 1π/6 (7π/6), and becomes zero when the electrical angle is 2π/3 (5π/3). That is, the induced voltages generated in the electromagnetic coils 100A, 100B and 100C are shifted from each other by 2π/3.

Figure 32A:
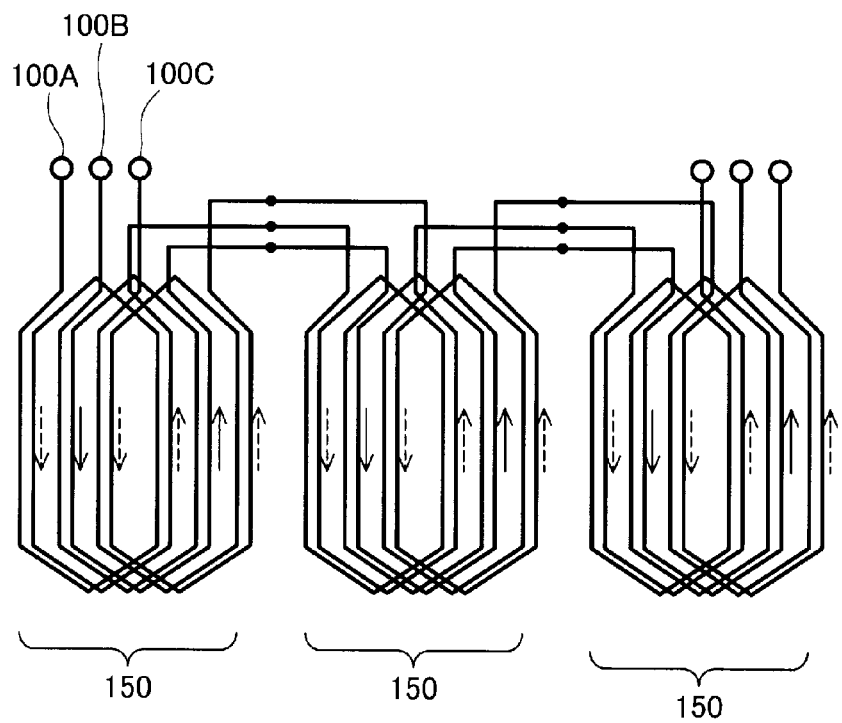
FIG. 32A is an explanatory view schematically showing wiring of the electromagnetic coils in the third embodiment.

FIG. 32A is an explanatory view schematically showing wiring of the electromagnetic coils in the third embodiment. Similarly to the second embodiment shown in FIG. 8, the electromagnetic coils 100A, 100B 100C can be easily divided into plural (three in this embodiment) electromagnetic coil sub-assemblies 150. That is, in the third embodiment, the electromagnetic coil sub-assemblies 150 are formed, and the electromagnetic coil sub-assemblies 150 are combined, so that the electromagnetic coil assembly 104 with coil back yoke can be easily formed. Incidentally, the electromagnetic coil sub-assemblies 155 with coil back yoke may be used.

Figure 32B:
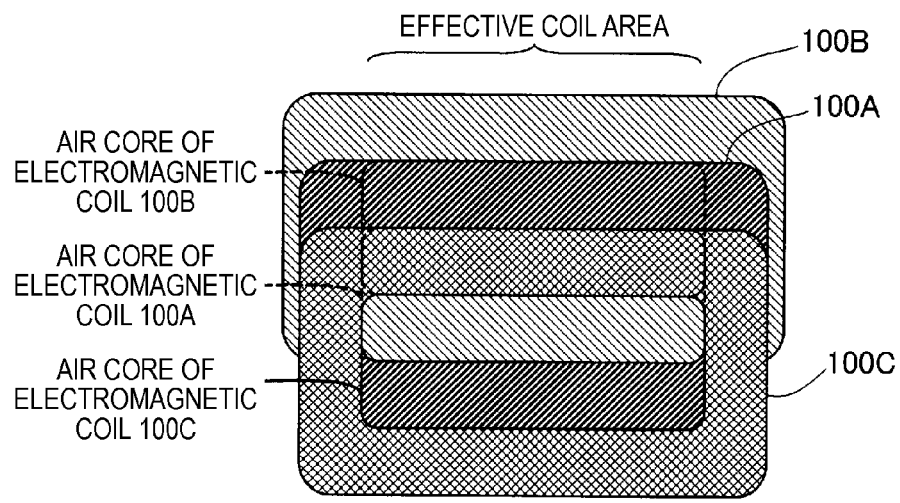
FIG. 32B is an explanatory view schematically showing the electromagnetic coils of the third embodiment.

FIG. 32B is an explanatory view schematically showing the electromagnetic coil in the third embodiment. The electromagnetic coils 100A, 100B and 100C overlap each other. The effective coil areas of the electromagnetic coils 100B and 100C are embedded in the air core portion of the electromagnetic coil 100A, the effective coil areas of the electromagnetic coils 100C and 100A are embedded in the air core portion of the electromagnetic coil 100B, and the effective coil areas of the electromagnetic coils 100A and 100B are embedded in the air core portion of the electromagnetic coil 100C.

Also in the three-phase coreless motor 10 as described in the third embodiment, similarly to the coreless motor of the second embodiment, the manufacturing process can be eased and the space factor can be improved. Incidentally, the same applies to a multi-phase motor of four or more phases.

Figure 33:
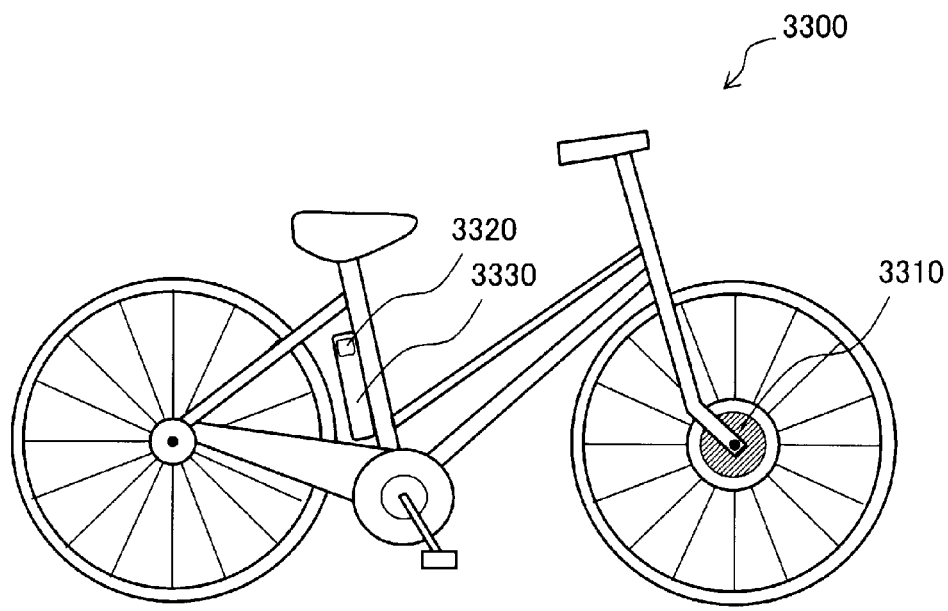
FIG. 33 is an explanatory view showing an electric bicycle (electric assist bicycle) as an example of a moving body using a motor/generator according to a modified example of the invention.

FIG. 33 is an explanatory view showing an electric bicycle (electric assist bicycle) as an example of a moving body using a motor/generator according to a modified example of the invention. In a bicycle 3300, a motor 3310 is provided on a front wheel, and a control circuit 3320 and a rechargeable battery 3330 are provided on a frame below a saddle. The motor 3310 uses power from the rechargeable battery 3330 and drives the front wheel to assist the traveling. Besides, at the time of braking, the power regenerated by the motor 3310 is charged into the rechargeable battery 3330. The control circuit 3320 is a circuit to control driving and regeneration of the motor. As the motor 3310, the foregoing various coreless motors 10 can be used.

Figure 34:
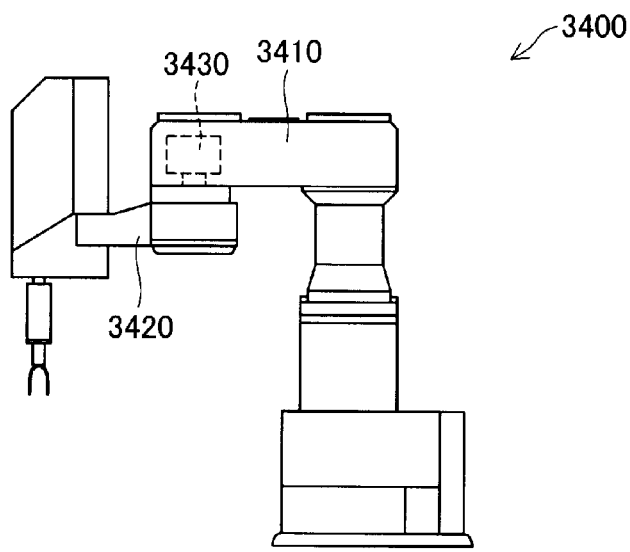
FIG. 34 is an explanatory view showing an example of a robot using a motor according to a modified example of the invention.

FIG. 34 is an explanatory view showing an example of a robot using a motor according to a modified example of the invention. A robot 3400 includes a first arm 3410, a second arm 3420 and a motor 3430. The motor 3430 is used when the second arm 3420 as a driven member is horizontally rotated. As the motor 3430, the foregoing various coreless motors 10 can be used.

Figure 35:
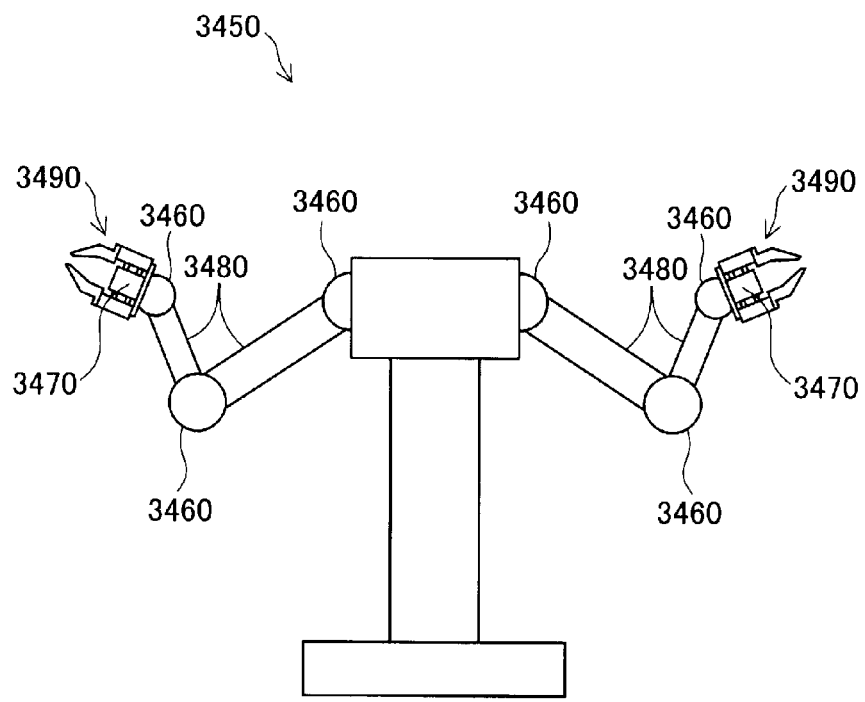
FIG. 35 is an explanatory view showing an example of two-arm seven axis robot using a motor according to a modified example of the invention.

FIG. 35 is an explanatory view showing an example of a two-arm seven axis robot using a motor according to a modified example of the invention. A two-arm seven axis robot 3450 includes joint motors 3460, grip motors 3470, arms 3480 and grip parts 3490. The joint motors 3460 are arranged at positions corresponding to a shoulder joint, an elbow joint and a wrist joint. The joint motor 3460 for each of the joints includes two motors in order to activate the arm 3480 and the grip part 3490 three-dimensionally. Besides, the grip motor 3470 opens and closes the grip part 3490, and causes the grip part 3490 to grip an object. In the two-arm seven axis robot 3450, the foregoing various coreless motors can be used as the joint motor 3460 or the grip motor 3470.

Figure 36:
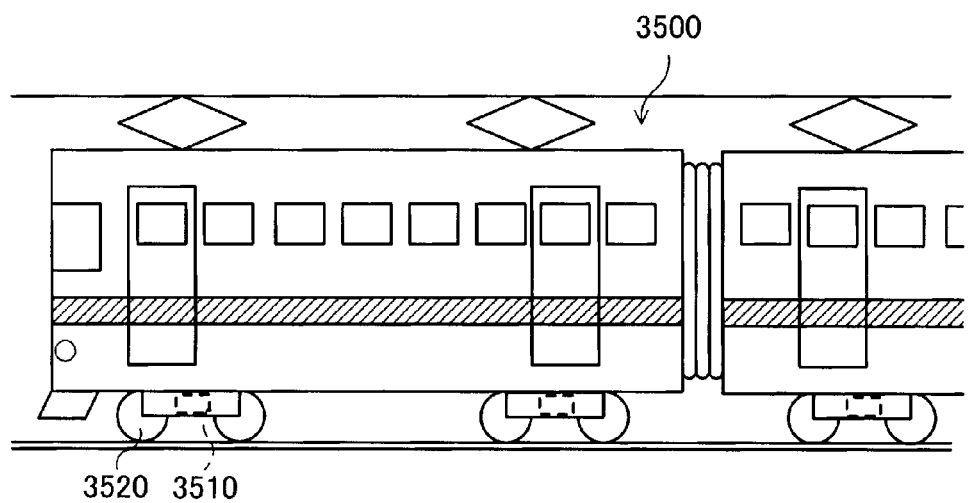
FIG. 36 is an explanatory view showing a railway vehicle using a motor according to a modified example of the invention.

FIG. 36 is an explanatory view showing a railway vehicle using a motor according to a modified example of the invention. A railway vehicle 3500 includes an electric motor 3510 and a wheel 3520. The electric motor 3510 drives the wheel 3520. Further, the electric motor 3510 is used as a generator at the time of braking of the railway vehicle 3500, and the power is regenerated. As the electric motor 3510, the foregoing various coreless motors 10 can be used.

Although the embodiments of the invention have been described based on some examples, these embodiments of the invention are intended to facilitate the understanding of the invention and do not limit the invention. The invention can be modified and improved without departing from the gist thereof and the scope recited in the appended claims, and the invention naturally includes the equivalent thereof.

The present application claims priority based on Japanese Patent Application No. 2011-125106 filed on Jun. 3, 2011, the disclosure of which is hereby incorporated by reference in its entirety.

What is claimed is:

1. A coreless electric machine apparatus including a first and a second cylindrical member movable relative to each other, comprising:
a permanent magnet arranged on the first member;
N-phase (N is an integer of 2 or more) air-core electromagnetic coils arranged on the second member; and
a coil back yoke arranged on the second member,
wherein
the electromagnetic coils include effective coil areas for generating a force to move the first member relatively to the second member, and coil end areas,
the effective coil areas of the N-phase electromagnetic coils have the same shape, and are arranged in a cylindrical area between the permanent magnet and the coil back yoke,
the coil end area of at least (N−1)-phase electromagnetic coil among the N-phase electromagnetic coils is bent to an inner peripheral side or an outer peripheral side of the cylindrical area to prevent interference with the coil end area of the electromagnetic coil of another phase,
each of the electromagnetic coils includes a conductor bundle in which a conductor is wound M (M is an integer of 2 or more) times,
coil sub-aggregates are provided, each of which includes the N electromagnetic coils of the respective N phases and in each of which a conductor bundle forming an effective coil area of a first-phase electromagnetic coil contacts a conductor bundle forming an effective coil area of another phase electromagnetic coil, and the conductor bundle forming the effective coil area of the another phase electromagnetic coil is contained in an air-core portion of the electromagnetic coil of the first phase, and
the coil sub-aggregates are arranged along the cylindrical area, in which the coil sub-aggregates do not overlap each other in a radiation direction of the cylindrical area, and the adjacent coil sub-aggregates contact each other.

2. The coreless electric machine apparatus according to claim 1, wherein
the value of N is 2,
each of the electromagnetic coils includes an air core having a same size as a width of the conductor bundle, and
a conductor bundle forming an effective coil area of a second electromagnetic coil is contained in an air core of a first electromagnetic coil.

3. The coreless electric machine apparatus according to claim 1, wherein
the value of N is 3,
each of the electromagnetic coils includes an air core having a size twice a width of the conductor bundle, and
conductor bundles forming effective coil areas of a second and a third electromagnetic coil are contained in an air core of a first electromagnetic coil.

4. A moving body comprising a coreless electric machine apparatus according to claim 1.

5. A moving body comprising a coreless electric machine apparatus according to claim 2.

6. A moving body comprising a coreless electric machine apparatus according to claim 3.

7. A robot comprising a coreless electric machine apparatus according to claim 1.

8. A robot comprising a coreless electric machine apparatus according to claim 2.

9. A robot comprising a coreless electric machine apparatus according to claim 3.

* * * * *